(12) United States Patent
Hom et al.

(10) Patent No.: US 10,769,711 B2
(45) Date of Patent: Sep. 8, 2020

(54) USER TASK FOCUS AND GUIDANCE FOR RECURRING REVENUE ASSET MANAGEMENT

(71) Applicant: ServiceSource International, Inc., San Francisco, CA (US)

(72) Inventors: Tyson Hom, San Francisco, CA (US); Elaine Scott, San Francisco, CA (US); Abhinav Vohra, San Francisco, CA (US); Jill Marchand, San Francisco, CA (US)

(73) Assignee: ServiceSource International, Inc., San Francisco, CA (US)

( * ) Notice: Subject to any disclaimer, the term of this patent is extended or adjusted under 35 U.S.C. 154(b) by 788 days.

(21) Appl. No.: 15/037,502

(22) PCT Filed: Nov. 18, 2014

(86) PCT No.: PCT/US2014/066230
§ 371 (c)(1),
(2) Date: May 18, 2016

(87) PCT Pub. No.: WO2015/074079
PCT Pub. Date: May 21, 2015

(65) Prior Publication Data
US 2016/0284012 A1 Sep. 29, 2016

Related U.S. Application Data

(60) Provisional application No. 61/905,798, filed on Nov. 18, 2013.

(51) Int. Cl.
*G06Q 30/00* (2012.01)
*G06Q 30/06* (2012.01)

(52) U.S. Cl.
CPC ......... *G06Q 30/0635* (2013.01); *G06Q 30/06* (2013.01); *G06Q 30/0611* (2013.01)

(58) Field of Classification Search
CPC ..................................................... G06Q 30/00
See application file for complete search history.

(56) References Cited

U.S. PATENT DOCUMENTS

| 4,354,225 A | 10/1982 | Frieder et al. |
| 4,527,237 A | 7/1985 | Frieder et al. |

(Continued)

FOREIGN PATENT DOCUMENTS

| JP | H06119309 A | 4/1994 |
| JP | H09044331 A | 2/1997 |

(Continued)

OTHER PUBLICATIONS

Oracle, "Oracle E-Business Suite Release 12 and 12.1 Customer Success Stories", Oracle.com, dated Sep. 15, 2011. (Year: 2011).*

(Continued)

*Primary Examiner* — Mark A Fadok
(74) *Attorney, Agent, or Firm* — Sheridan Ross P.C.

(57) ABSTRACT

A consistent approach to managing opportunities, quotes, and bookings activities can be managed through the use of a recurring revenue asset management application, which can be supported by one or more features of an asset data model. Such an application can include the use of focus categories and playbooks.

20 Claims, 16 Drawing Sheets

(56) References Cited

U.S. PATENT DOCUMENTS

| | | | |
|---|---|---|---|
| 5,530,863 A | 6/1996 | Hino | |
| 5,550,734 A | 8/1996 | Tarter et al. | |
| 5,704,044 A | 12/1997 | Tarter et al. | |
| 6,131,085 A | 10/2000 | Rossides | |
| 6,473,794 B1 | 10/2002 | Guheen et al. | |
| 6,684,191 B1* | 1/2004 | Barnard | G06Q 10/06 |
| | | | 705/7.22 |
| 6,687,677 B1* | 2/2004 | Barnard | G06Q 10/06311 |
| | | | 705/7.15 |
| 6,721,713 B1 | 4/2004 | Guheen et al. | |
| 6,856,679 B2* | 2/2005 | Pennington, Jr. | G06Q 30/02 |
| | | | 379/265.01 |
| 7,191,183 B1 | 3/2007 | Goldstein | |
| 7,215,757 B2* | 5/2007 | Pennington, Jr. | G06Q 30/02 |
| | | | 379/265.01 |
| 7,315,826 B1 | 1/2008 | Guheen et al. | |
| 7,425,700 B2 | 9/2008 | Stults et al. | |
| 7,593,522 B2* | 9/2009 | Parker-Stephen | |
| | | | H04M 3/5133 |
| | | | 379/265.01 |
| 8,001,013 B2 | 8/2011 | Serbanescu | |
| 8,010,404 B1 | 8/2011 | Wu et al. | |
| 8,046,295 B1 | 10/2011 | Cohan | |
| 8,046,362 B2 | 10/2011 | Bayliss | |
| 8,140,381 B1 | 3/2012 | Wu et al. | |
| 8,176,083 B2 | 5/2012 | Vossen et al. | |
| 8,204,809 B1 | 6/2012 | Wise | |
| 8,612,582 B2 | 12/2013 | Dare et al. | |
| 8,706,498 B2* | 4/2014 | George | H04M 3/4936 |
| | | | 379/265.01 |
| 8,755,510 B2* | 6/2014 | Erbey | G06Q 30/016 |
| | | | 379/265.02 |
| 8,793,753 B2 | 7/2014 | Bhogal et al. | |
| 8,843,385 B2 | 9/2014 | Jurca et al. | |
| 2001/0013030 A1 | 8/2001 | Colby et al. | |
| 2002/0065752 A1 | 5/2002 | Lewis | |
| 2002/0065879 A1 | 5/2002 | Ambrose et al. | |
| 2002/0091539 A1 | 7/2002 | Yin et al. | |
| 2002/0128938 A1 | 9/2002 | Schofield et al. | |
| 2002/0147726 A1 | 10/2002 | Yehia et al. | |
| 2002/0147815 A1 | 10/2002 | Tormasov et al. | |
| 2002/0169777 A1 | 11/2002 | Balajel et al. | |
| 2003/0036683 A1 | 2/2003 | Kehr et al. | |
| 2003/0206621 A1* | 11/2003 | Pennington, Jr. | G06Q 30/02 |
| | | | 379/265.01 |
| 2004/0006506 A1 | 1/2004 | Hoang | |
| 2004/0034699 A1 | 2/2004 | Gotz et al. | |
| 2004/0107125 A1 | 6/2004 | Guheen et al. | |
| 2004/0167789 A1 | 8/2004 | Roberts et al. | |
| 2004/0172374 A1 | 9/2004 | Forman | |
| 2004/0220790 A1 | 11/2004 | Cullick et al. | |
| 2005/0053224 A1* | 3/2005 | Pennington, Jr. | G06Q 30/02 |
| | | | 379/265.09 |
| 2005/0096950 A1 | 5/2005 | Caplan et al. | |
| 2005/0096963 A1 | 5/2005 | Myr et al. | |
| 2005/0108043 A1 | 5/2005 | Davidson | |
| 2005/0279824 A1 | 12/2005 | Anderson et al. | |
| 2006/0059054 A1 | 3/2006 | Adiseshan | |
| 2007/0067297 A1 | 3/2007 | Kublickis | |
| 2007/0091874 A1 | 4/2007 | Rockel et al. | |
| 2007/0206757 A1* | 9/2007 | Pennington, Jr. | G06Q 30/02 |
| | | | 379/201.04 |
| 2007/0243887 A1 | 10/2007 | Bandhole et al. | |
| 2007/0265904 A1 | 11/2007 | Lindquist et al. | |
| 2008/0071561 A1 | 3/2008 | Holcombe | |
| 2008/0133324 A1 | 6/2008 | Jackson et al. | |
| 2008/0154625 A1 | 6/2008 | Serbanescu | |
| 2008/0215492 A1* | 9/2008 | Pieper | G06Q 10/06 |
| | | | 705/59 |
| 2008/0270256 A1 | 10/2008 | Caballero et al. | |
| 2008/0288889 A1 | 11/2008 | Hunt et al. | |
| 2009/0024543 A1 | 1/2009 | Horowitz et al. | |
| 2009/0163183 A1* | 6/2009 | O'Donoghue | G06Q 30/02 |
| | | | 455/414.1 |
| 2009/0210228 A1* | 8/2009 | George | H04M 3/4936 |
| | | | 704/251 |
| 2009/0234710 A1 | 9/2009 | Belgaied Hassine et al. | |
| 2009/0240551 A1 | 9/2009 | Writz et al. | |
| 2009/0240586 A1 | 9/2009 | Ramer et al. | |
| 2010/0010967 A1 | 1/2010 | Muller | |
| 2010/0088155 A1 | 4/2010 | Pyle et al. | |
| 2010/0121830 A1 | 5/2010 | Berry et al. | |
| 2010/0218104 A1 | 8/2010 | Lewis | |
| 2010/0318451 A1 | 12/2010 | Niccolini et al. | |
| 2011/0238948 A1 | 9/2011 | Vorbach et al. | |
| 2011/0246254 A1 | 10/2011 | Johnson et al. | |
| 2011/0295722 A1 | 12/2011 | Reisman | |
| 2012/0032945 A1 | 2/2012 | Dare et al. | |
| 2012/0197686 A1 | 8/2012 | Abu El Ata | |
| 2012/0296695 A1* | 11/2012 | McGill | G06Q 40/08 |
| | | | 705/7.28 |
| 2013/0024342 A1 | 1/2013 | Horowitz et al. | |
| 2013/0035992 A1 | 2/2013 | Silverman | |
| 2013/0211986 A1 | 8/2013 | DeBie et al. | |
| 2013/0268437 A1 | 10/2013 | Desai et al. | |
| 2013/0339088 A1 | 12/2013 | Olsen et al. | |
| 2013/0339089 A1 | 12/2013 | Olsen et al. | |
| 2014/0114709 A1 | 4/2014 | Olsen et al. | |
| 2014/0114818 A1 | 4/2014 | Olsen et al. | |
| 2014/0114819 A1 | 4/2014 | Olsen et al. | |
| 2014/0122176 A1 | 5/2014 | Olsen et al. | |
| 2014/0122240 A1 | 5/2014 | Olsen et al. | |
| 2014/0156343 A1 | 6/2014 | Olsen et al. | |
| 2015/0046204 A1* | 2/2015 | Sitina | G06Q 10/063 |
| | | | 705/7.11 |

FOREIGN PATENT DOCUMENTS

| | | |
|---|---|---|
| JP | H10105619 A | 4/1998 |
| JP | 2004-86269 A | 3/2004 |
| JP | 2004-519758 A | 7/2004 |
| JP | 2005-071191 A | 3/2005 |
| JP | 2006-526852 A | 11/2006 |
| JP | 2007-026147 A | 2/2007 |
| JP | 2007-531939 A | 11/2007 |
| JP | 2008-537266 A | 9/2008 |
| WO | WO-01/90998 A2 | 11/2001 |
| WO | WO-2004/109451 A2 | 12/2004 |

OTHER PUBLICATIONS

International Search Report issued in International Application No. PCT/US2013/046439, dated Feb. 7, 2014.

International Search Report issued in International Application No. PCT/US2013/046440, dated Jun. 6, 2014.

International Search Report issued in International Application No. PCT/US2014/066230, dated Feb. 23, 2015.

ServiceSource Launches eCommerce Cloud Application. *ServiceSource.* Mar. 8, 2011. [online]. Retrieved on May 18, 2014. Retrieved from the internet. <http://files.shareholdercom/downloads/ABEA-5LUUYL/3185849553x0x469467/674f7951-83ba-4692-97bd-3efbc99b32b4/SREV_News_2011_5_17_General_Releases.pdf>.

Aldana, Walter Alberto. Data mining industry: emerging trends and new opportunities. Diss. Massachusetts Institute of Technology, Dept. of Electrical Engineering and Computer Science, 2000. 182 pages.

Brockmann, Carsten, and Norbert Gronau. "Business models of ERP system providers." AMCIS 2009 Proceedings (2009): 582. (12 pages).

Gurau, Cahn, and Ashok Ranchhod. "Measuring customer satisfaction: a platform for calculating, predicting and increasing customer profitability." Journal of Targeting, Measurement and Analysis for Marketing 10.3 (2002): 203-219.

Jones, Z., et al. "Design of a pulse oximeter for price sensitive emerging markets." 2010 Annual International Conference of the IEEE Engineering in Medicine and Biology. IEEE, 2010. pp. 185-188.

Liberatore, Matthew J., and Wenhong Luo. "The Analytics Movement: Implications for Operations Research." Interfaces 40.4 (2010): 313-324.

(56) References Cited

OTHER PUBLICATIONS

Power, Daniel J., and Ramesh Sharda. "Model-driven decision support systems: Concepts and research directions." Decision Support Systems 43.3 (2007): 1044-1061.
Tounsi, Mohamed (Iyes. Application and Survey of Business Intelligence (BI) Tools within the Context of Military Decision Making. Diss. Monterey, California. Naval Postgraduate School, 2012. 104 pages.
Zorrilla, Marta, and Diego Garcia-Saiz. "A service oriented architecture to provide data mining services for non-expert data miners." Decision Support Systems 55.1 (2013): 399-411.
U.S. Appl. No. 13/841,681, filed Mar. 15, 2013, US 2014-0114709.
U.S. Appl. No. 13/842,035, filed Mar. 15, 2013, US 2014-0114818.
U.S. Appl. No. 13/842,398, filed Mar. 15, 2013, US 2014-0114819.
U.S. Appl. No. 13/844,306, filed Mar. 15, 2013, US 2014-0122176.
U.S. Appl. No. 13/895,294, filed May 15, 2013, US 2013-0339088.
U.S. Appl. No. 13/895,302, filed May 15, 2013, US 2013-0339089.

\* cited by examiner

USER TASK FOCUS AND GUIDANCE FOR RECURRING REVENUE ASSET MANAGEMENT

RELATED APPLICATIONS

This application is a national stage application, filed under 35 U.S.C. § 371, of International Application No. PCT/US2014/066230 filed on Nov. 18, 2014, which claims priority to U.S. Provisional Patent Application No. 61/905,798 filed Nov. 18, 2013, the contents of which are hereby fully incorporated by reference.

TECHNICAL FIELD

The subject matter described herein relates to data processing and management, and more particularly to processing and managing recurring revenue asset information.

BACKGROUND

Management of recurring revenue assets can present a number of challenges that differ in substantial and important ways from the typical focus of the sales staff of a commercial entity. As used herein, a recurring revenue asset can generally refer to one or more of maintenance and/or support agreements for software or hardware, service covered products, service contracts, subscription agreements, warranties, renewables, or the like.

Optimizing revenues obtainable from a commercial entity's recurring revenue assets (e.g. service contracts and other service assets) requires resolving a number of sales challenges that may not be optimally addressed by existing solutions because of differences between renewal sales and new sales (also referred to as "initial sales"). For example, while a typical new sale process involves closing a sale or deal and moving on to a next customer, a recurring revenue relationship is by definition repetitive, and is not efficiently tracked or managed by tools designed to support new sales. In addition, the commercial entity's existing investments in sales personnel, sales processes, and information systems are typically directed to, and are optimized and supported with appropriate technology for, achieving maximum revenue performance in the product or services new sales business, not the management of recurring revenue streams and the sales activities necessary to ensure that recurring revenue assets are maintained and even increased in value.

SUMMARY

The subject matter described herein includes a number of features that can be included in any feasible combination as part of a recurring revenue management approach. For example, focus categories can be defined that identify particular sales opportunities on which a sales representative should focus. The focus categories can be assigned to individual sales representatives or to groups of sales representatives. A focus category definition includes one or more criteria, parameters, etc. that can be configured such that the focus category applies to a subset of renewal sales opportunities. The focus categories can also include prioritization capabilities, thereby allowing a first user with managerial or supervisory responsibilities for one or more second users with sales responsibilities to designate which of one or more focus categories should be assigned to each of the second users and a priority ranking of the focus categories for the second users. The first user can configure the definition for a focus category, designate a priority ranking for the focus category among a set of focus categories, and assign the focus category to a second user through interactions with a first user interface. A second user interface presented to the second user can reflect these configuration activities by showing assigned focus categories according to the prioritized ranking and by including within the displayed focus categories those opportunities with which the second user is associated and which are included within the focus category according to the configured definition of the focus category. In some variations, selection by the second user of a specific opportunity in the second user interface can result in display of a playbook including stages and sub-stages of the renewal process that can guide the second user through suggested next steps for moving the opportunity toward a successful closing during a target time period. In some further variations, multiple playbooks can be defined for sales opportunities having different characteristics, and the appropriate playbook is selected for a given sales opportunity based on the characteristics of the sales opportunities. In further embodiments, a playbook can include definable and configurable stages and sub-stages for handling of operations associated with an opportunity object in a recurring revenue asset data model or with any other object type in the recurring revenue asset data model.

In one aspect a computer-implemented method includes receiving a prioritization of a focus category applying to a subset of renewal sales opportunities managed by a recurring revenue management system and an assignment of the focus category to a second user of the recurring revenue management system. The prioritization and the assignment are received from a first user of the recurring revenue management system via a first graphical user interface. The method further includes causing a second graphical user interface displayed to the second user to include a focus category user interface element corresponding to the focus category and to reflect prioritization of the focus category relative to one or more other focus categories assigned to the second user as well as causing a display in the second graphical user interface of a playbook. The playbook includes stages and sub-stages of a renewal sales process to guide the second user through a sequence of suggested actions for moving a renewal sales opportunity of the subset of renewal sales opportunities toward a successful closing during a target time period. The method further includes causing a third graphical user interface displayed to a third user of the recurring revenue management system to which the focus category is not assigned to not include the focus category user interface element corresponding to the focus category.

In an interrelated aspect, a computer-implemented method includes comparing attributes of one or more data objects associated with a renewal sales opportunity to one or more defined characteristics for a playbook, selecting the playbook for use with the renewal sales opportunity based on the comparing, causing a graphical user interface displayed to a user to indicate a sequence of one or more suggested future actions to be performed by the user in association with the renewal sales opportunity, detecting a change in the current context of the one or more data object instances, and causing, in response to the detecting of the change in the context, the graphical user interface displayed to the user to reflect at least one different suggested future action. The playbook includes stages and sub-stages of a renewal sales process to guide a user through a sequence of suggested next steps for moving the renewal sales opportunity toward a successful closing during a target time period.

The sequence of one or more suggested future actions are defined by the playbook based on a current context of one or more data object instances associated with the renewal sales opportunity.

In optional variations, one or more of the following features can be included in any feasible combination. A focus category can include a focus category definition comprising configurable criteria and parameters that determine the subset of renewal sales opportunities to which the focus category applies. A method can further include tagging a renewal sales opportunity to the focus category such that the renewal sales opportunity remains visible within the focus category even if the renewal sales opportunity no longer fits one or more criteria defined in the focus category definition. The configurable criteria and parameters can include opportunity criteria defining one or more types of renewal sales opportunities contained in the focus category and success criteria defining how a completed renewal sales opportunity moves out of the focus category. The prioritization of the focus category can include a prioritized ranking of the focus category relative to a plurality of focus categories available to be displayed to the second user via the second graphical user interface. The second graphical user interface can include a focus category section within which the focus category and one or more other focus categories of the plurality of focus categories are displayed to the second user. The focus category section can display, for each focus category, at least one of a number of renewal sales opportunities in the focus category, a value of renewal sales opportunities remaining to move out of the focus category, a value of renewal sales opportunities that have been moved out of the focus category, and a navigation user interface element to allow a drill-down into details on renewal sales opportunities contained in the focus category. A focus category and the prioritization of the focus category can be visually displayed to the second user to focus activities of the second user related to renewal sales opportunities, to convey progress on the activities, and to direct navigation to complete the activities. Activities can include one or more of closing opportunities, contacting opportunities, and moving an opportunity sales stage. A method can further include receiving, from the first user via the first graphical user interface, a change to one or more of a focus category definition for the focus category and the assignment of the focus category, and dynamically causing the change to be reflected at the second graphical user interface. The second graphical user interface can include a timing status section that shows a graphical depiction of activities relating to carryover and future renewal sales opportunities targeted to close in a current selling period. The carryover opportunities can include opportunities originally scheduled for a previous selling period that are now targeted to close in the current period, and the future opportunities can include opportunities from one or more upcoming selling periods that are now targeted to close in the current selling period.

Different suggested future actions can be defined by the original playbook. Alternatively, a different suggested future action can be defined by a second playbook, and the method can include selecting the second playbook based on the change in the current context. The one or more data objects can be part of an asset data model comprising a flexible mechanism for representing complex relationships among assets, organizations, people, and products. The one or more data object instances can include product object instances representing products upon which recurring revenue assets are based, asset object instances representing the recurring revenue assets, opportunity object instances representing opportunities for renewal of the recurring revenue assets, and contact object instances representing contacts relating to one or more other data objects in the asset data model. A playbook can include contextual logic that detects and understands impacts of completed actions in the renewal sales process on the current context of the one or more data object instances, and wherein the at least one different suggested future action is determined based on the contextual logic. A current context can include a state of the one or more data object instances along the sequence of one or more future actions defined in the playbook. Selecting of a playbook can include determining that the playbook has defined characteristics matching the attributes of the one or more data objects.

Among other possible implementations, computer-implemented methods can include one or more of the functions, processes, operations, or the like performed by computing hardware, which can include computer circuitry, a programmable processor (also referred to as a general purpose processor) executing machine-readable instructions that cause it to perform operations, etc. Distributed computing frameworks, in which multiple programmable processors within a single computing system or in multiple linked computing systems are also consistent with the approaches described herein. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Also consistent with the descriptions provided herein, an article can include a tangibly embodied machine-readable medium operable to cause one or more machines (e.g., computers, etc.) to result in operations implementing one or more of the described features. For example, a non-transitory, machine-readable medium can include, encode, store, or the like instructions (e.g. one or more computer programs) that cause one or more programmable processors to perform one or more of the operations described herein when executed. Similarly, computing systems are also described that may include one or more processors and one or more memories coupled to the one or more processors and storing such instructions for execution by the one or more processors.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to recurring revenue asset management approaches or other business software solutions or architectures, it should be readily understood that such features are not necessarily intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A consistent approach to managing opportunities, quotes, and bookings activities can be managed through the use of a recurring revenue asset management application, which can be supported by one or more features of an asset data model. The term "opportunities" refers to groupings of one or more renewal offers targeted for execution of a sale to a customer. Offers are individual instances of a recurring revenue asset available for renewal. The groupings of offers in an opportunity can include multiple offer instances for the same customer. In some examples, the offers grouped into an opportunity can all have expiration dates during a sale period (e.g. a month, a quarter, a year, etc.).

Figure 10:
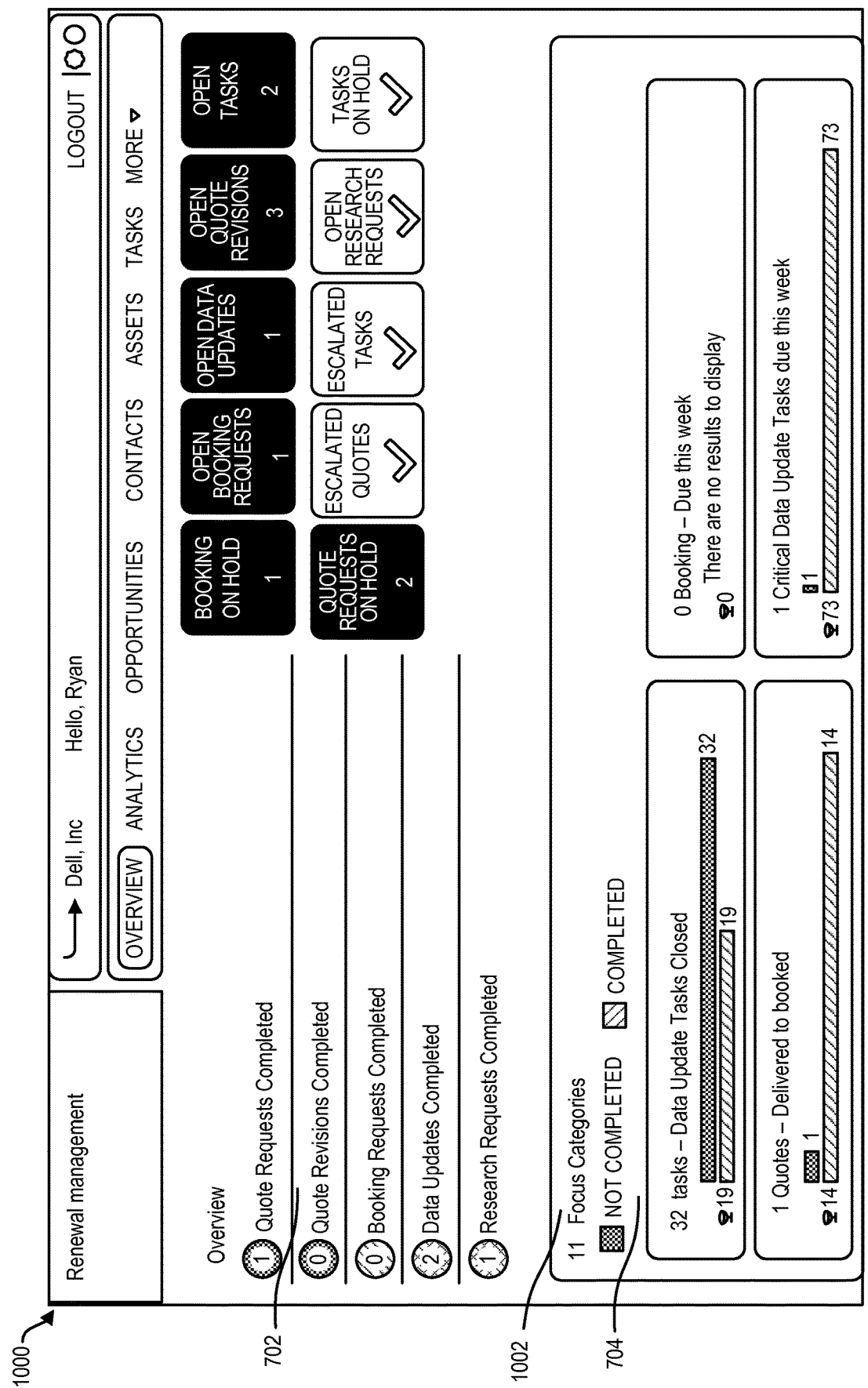
Figure 11:
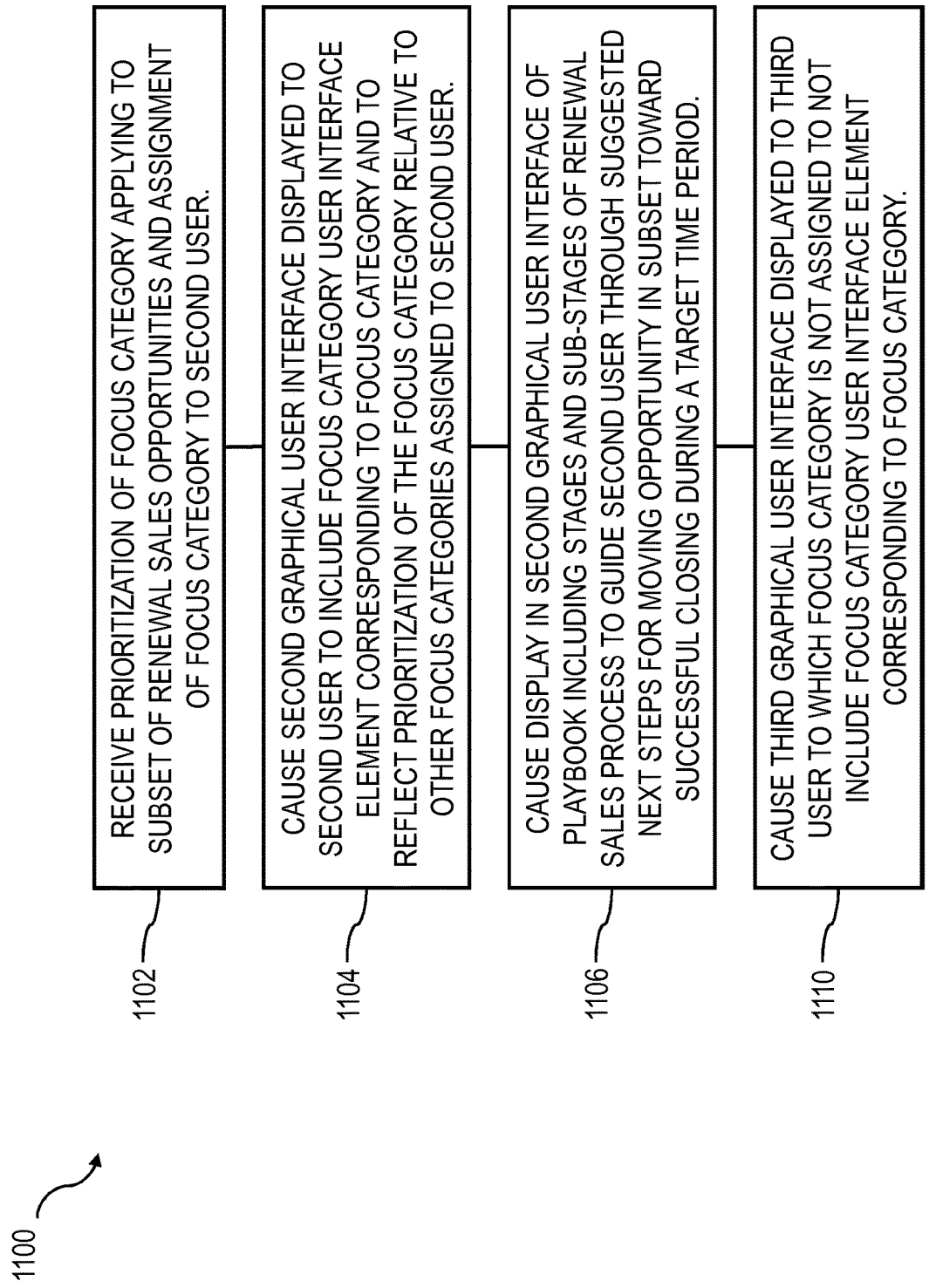
FIG. 11 and FIG. 12 show process flow diagrams illustrating aspects of methods having one or more features consistent with implementations of the current subject matter.
Figure 12:
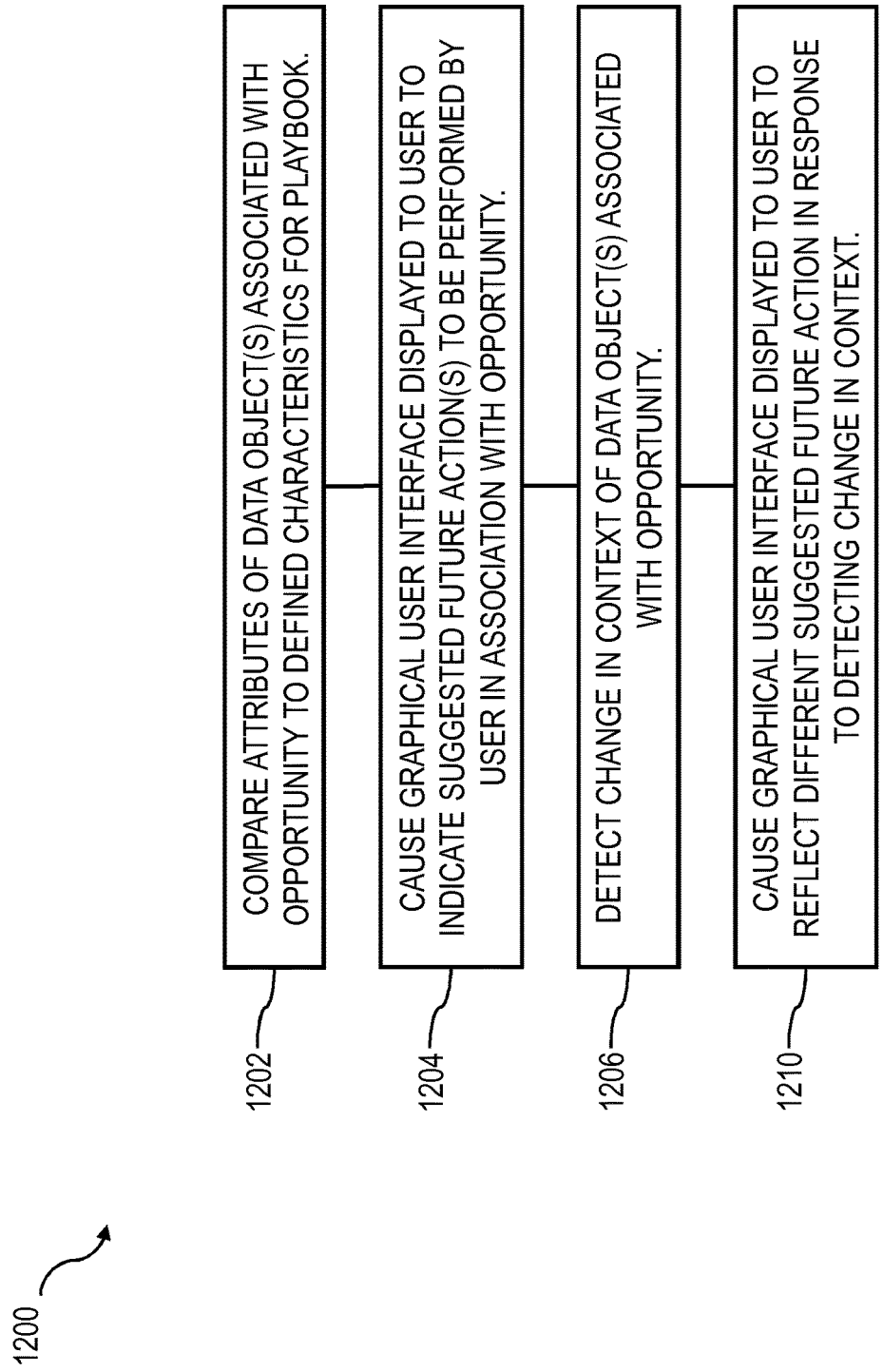

Co-owned and co-pending U.S. patent applications Ser. No. 13/841,681, 13/844,306, and 13/895,276, the disclosures of which are incorporated herein by reference, describe various aspects of a recurring revenue repository capable of supporting a recurring revenue asset data model that represents relationships among recurring revenue assets and organizations, people and products associated with the recurring revenue assets, and the like. FIG. 10, FIG. 11, and FIG. 12, which are discussed in more detail below, explain various data management and system architecture features that can be included in a recurring revenue asset management approach consistent with implementations of the current subject matter. Such features can include, but are not limited to, detailed reports, pipeline dashboards, opportunity details, territory management, and the like. Detailed reports allow sales representatives to proactively identify and address at-risk opportunities, while pipeline dashboards allow managers to view pacing of sales activities by time period and production metrics. Opportunity details can allow viewing of deal progress and logged activities by sales representative, sales operations assistants, managers, and other staff Territory management allows managers to manage and drive sales representatives' behavior by assigning tasks to opportunities based on existing priorities. Territory can refer to divisions of available opportunities based on one or more factors, which can include but are not limited to geography, customer groupings, subject matter, etc.

A sales representative, who can be part of a renewal sales team, group, etc., can typically have several opportunities that he or she should be working on in a given sales period. A sales period can be a quarter, a month, multiple quarters, or any arbitrary period of time during which sales targets, forecasts, metrics, etc. are made and compared.

Figure 1:
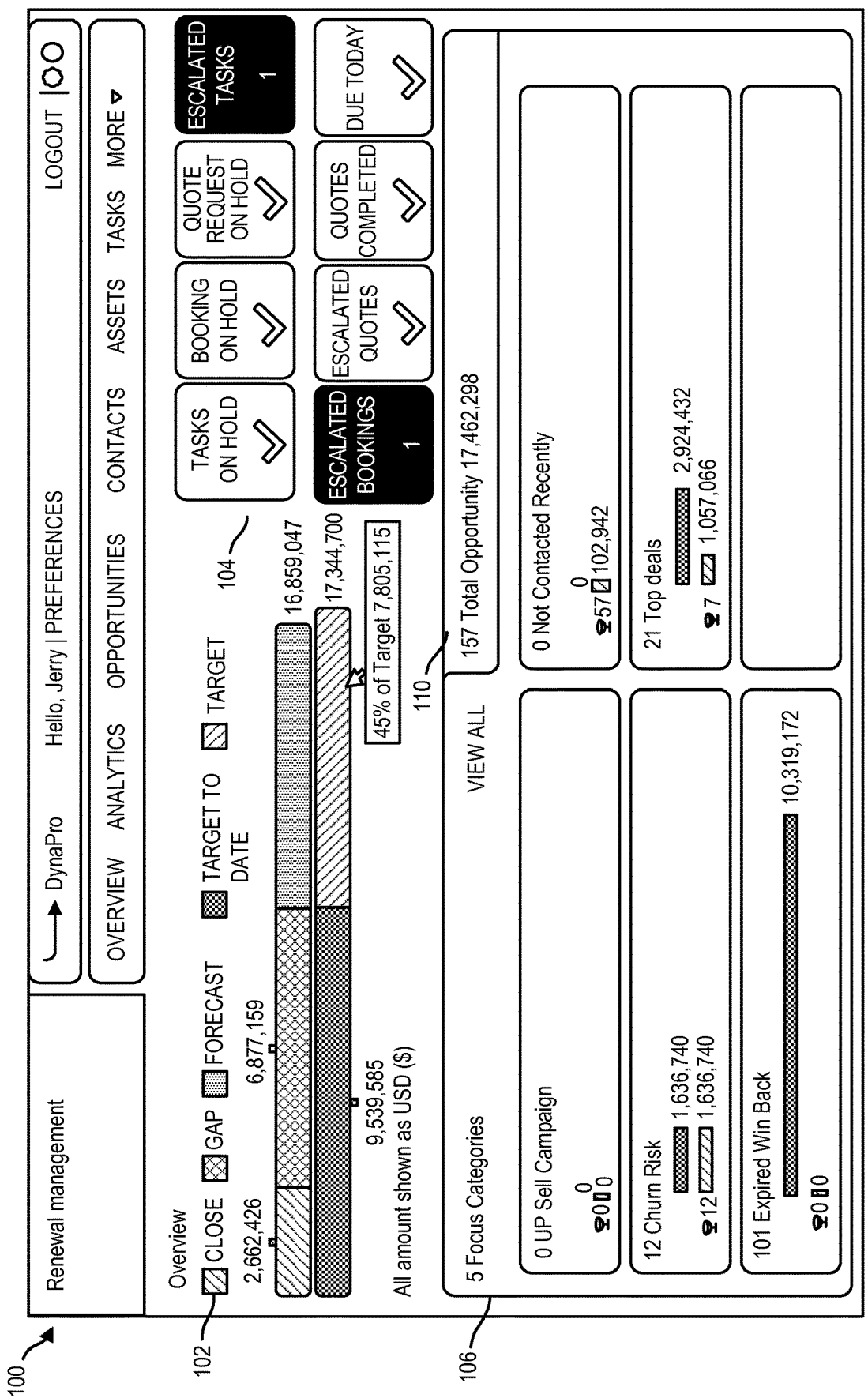
FIG. 1 through FIG. 10 show user interface screenshot views illustrating example features of the described subject matter.

FIG. 1 shows a screenshot view 100 illustrating features of a user interface that can be included in a recurring revenue asset management application for use by a sales representative user. A dashboard user interface similar to that shown in FIG. 1 can provide a sales representative user with information and guidance about tasks and areas of focus that are emphasized according to a set of parameters. In an example in which the sales representative user is part of a renewal sales team or otherwise involved in performing renewal sales tasks, the sales representative user can consult the dashboard user interface to determine which opportunities he or she should be working on and to assist in focusing attention on the key tasks of the day, week, etc. As shown in FIG. 1, the dashboard user interface can include an overview section 102, a pending tasks section 104, a focus categories section 106, and an opportunities information section 110.

In the overview section 102, snapshot statistics representative of progress toward sales targets in the current sales period can be shown along with a summary of status of the opportunities assigned to the sales representative. The displayed information can relate to recurring revenue opportunities designated to the sales representative and can include forecasted revenue for a sales period, which is an estimated or calculated amount of revenue the user is forecasting to close for the selling period, for example as a function of revenue realized from opportunities closed in the sales period, remaining open opportunities in the sales period, etc. The overview section 102 can also display target revenue for the sales period (e.g. the amount of revenue or number of quotes the sales representative user has been targeted to close for the selling period) as well as target to date revenue (e.g. the amount of revenue the user has closed during the selling period up to the current point in time to meet the target), and closed revenue (e.g. the actual amount of revenue the sales representative user has closed during the selling period), and the gap (e.g. the difference between closed revenue and the target to date, which indicates how far behind the sales representative user is on achieving the target for the sales period. The values displayed in the overview section 102 and elsewhere in the user interface features discussed below can be generated based on a recurring revenue asset model and data stored in a recurring revenue asset repository.

The pending tasks section 104 can include a visual depiction of activities that are pending or that require attention or other interaction from the user. Tasks assigned to the user that have a dependency on or otherwise require the user to take action can be summarized here. The pending tasks can be grouped using one or more common features, such as for example tasks on hold, bookings on hold, quote request on hold, escalated tasks, escalated bookings, escalated quotes, quotes completed, due today, etc. In general, such tasks will remain on hold until the user completes them. The visual depiction can provide an indication of whether a pending tasks or other action item exists in each grouping and/or how many such tasks or action items require attention. Data from the asset data model can be accessed and processed to generate the proper visual depiction for each grouping. The groupings of pending task or action item reminders can also be configurable such that an administrator, manager, or the like can assign labels for task/items groupings and define one or more criteria for determining how the types of items should be displayed in a pending tasks section 104.

The focus categories section 106 can include one or more categories of opportunities, and can be useful in helping a sales representative user to determine those opportunities on which he or she should be focusing available resources (e.g. work effort, time, etc.). Focus categories can assist in focusing sales representative user activity related to opportunities, conveying progress on those activities, and directing navigation to complete the activities. Activities can include closing opportunities, contacting opportunities, moving an opportunity sales stage, etc.

In the example of FIG. 1, five focus categories are displayed: up sell campaign, churn risk, expired win back, not contacted recently, and top deals. As discussed in greater detail below, the focus categories can be fully configurable, and changes to the focus category definitions, assignments, and prioritization can be dynamically reflected at a sales representative's user interface. For each focus category, the focus category section 104 can display at least one of the number of opportunities in the category (e.g. 21 in the "Top Deals" focus category), the value of the opportunities remaining to move out of the category and the value of the opportunities that have been moved out of the category (which can be shown using a bar chart or other graphic, numerical values, etc.), and/or a navigation user interface element to allow a drill-down into details on opportunities contained in the category.

Figure 2:
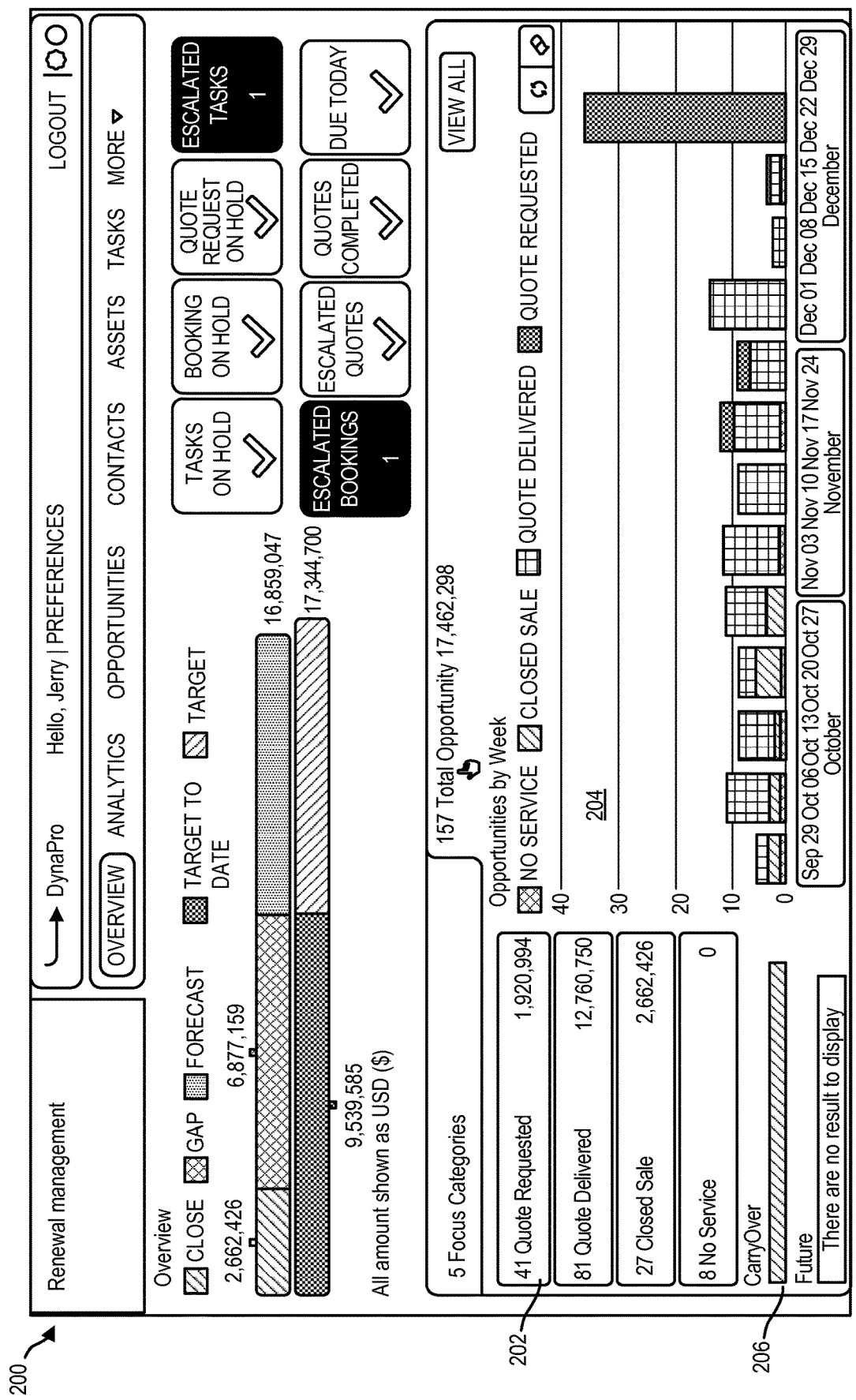

The total opportunities section 110 can include a count of opportunities and/or a total revenue value for the opportunities and can link to a different drill-down display as shown in the screenshot view 200 of FIG. 2. Total opportunities refers to information and navigation related to all opportunities assigned to the user. Opportunities can be displayed in a sales stage section 202 grouped by the current sales stage of each opportunity (e.g. quote requested, quote delivered, closed sale, no service, not contacted, contacted, etc.) to show the number of opportunities in each sales stage and the value of the opportunities assigned to that sales stage. A user can navigate to all opportunities currently within a specific sales stage by clicking on the sales stage name or on some other user interface navigation element. An "opportunities by period" (e.g. week, month, etc.) section 204 can display information on opportunities reflecting a current sales stage and a temporal component (e.g. on a weekly basis for the selling period). Each stage can be displayed in the chart using a unique color so the user can see if opportunities exist in a sales stage that is inconsistent with its timeframe. For example, an opportunity in a past week having the sales stage "Not Contacted" might be of particular interest as a high priority item for the sales representative user to address. The graphics representing each week (or other period) can include navigation links to provide access to the opportunities assigned to the week A timing status section 206 can include a graphical depiction of activities relating to carryover and future opportunities, in other words, opportunities targeted to close during the current the selling period with an expiration date outside the selling period (such as previous or next quarter). Carryover opportunities are those originally scheduled for a previous selling period that are now targeted to close in the current period. Future opportunities are those opportunities from upcoming sales period that are now targeted to close in the current sales period. As with the other display elements, the elements in the timing status section 206 can also include navigation links to allow drill down to additional information on the represented opportunities.

Figure 3:
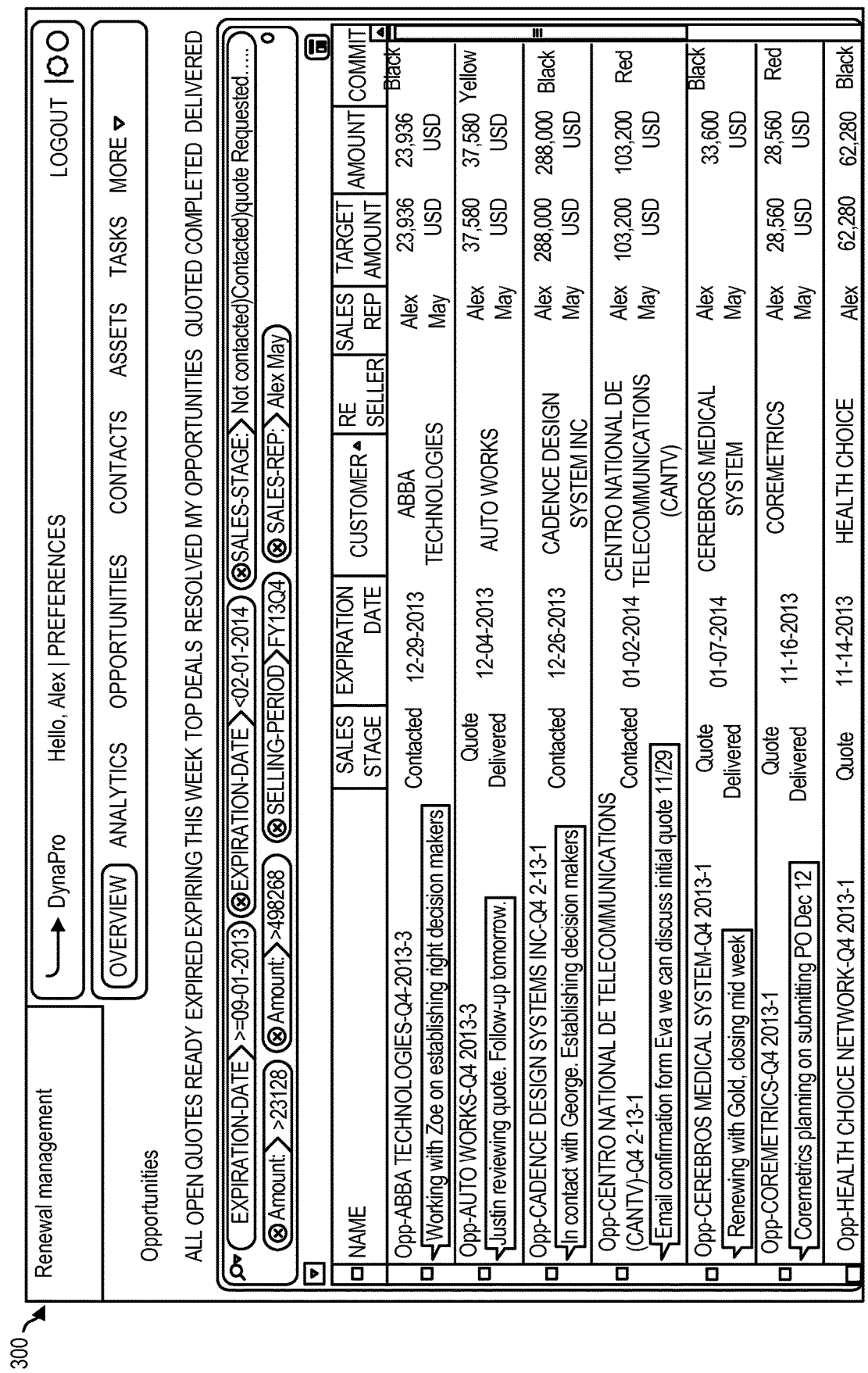

FIG. 3 shows a screenshot view 300 illustrating features of a drill-down screen reachable by selection of one of the focus categories in the focus category section 106 of the dashboard shown in FIG. 1. The drill down can include a list of opportunities that fit within the focus category. Each opportunity can include further detail regarding that opportunity as well as navigation links to allow the sales representative user to access additional information, task screens, etc. related to that opportunity.

Figure 4:
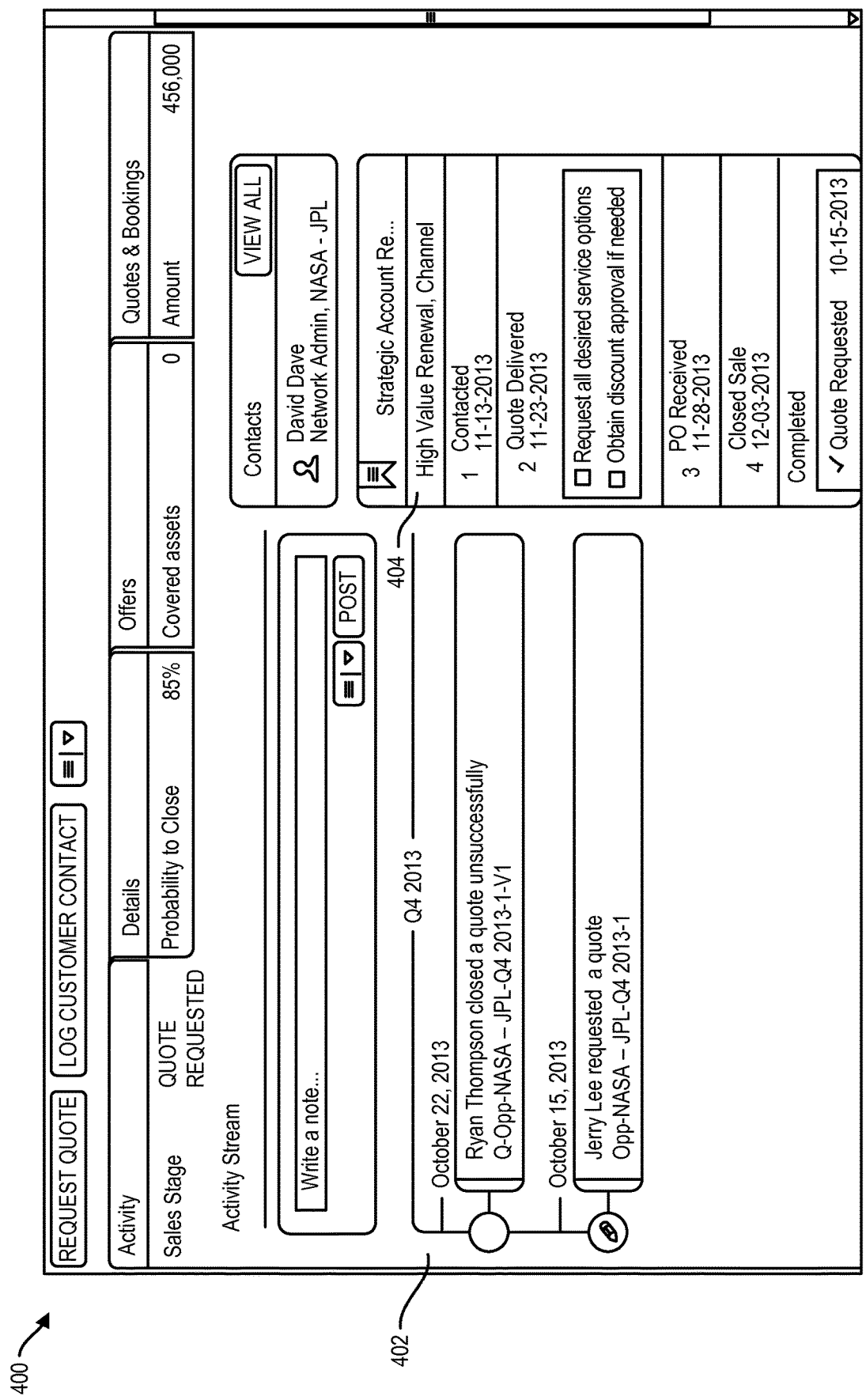

The screenshot view 400 of FIG. 4 shows features of an activity screen that can be presented to a sales representative user as part of a guided sales process management interface. The activity stream 402 on the left side of the screen can show a running feed of actions performed by team members. This can serve as way to rapidly convey outcome information on opportunities across the sales team. To the right of the activity stream display 402 in FIG. 4, a playbook section 404 can include configurable, recommended next best actions that are contextually related to an opportunity sales stage. Based on the opportunity sales stage, the playbook section can display completed actions, future actions to be completed, and suggested options for next actions to take in moving an opportunity to a successful close in a timely manner, and can also include content items (e.g. instructional videos or documents, call scripts, sales reminders or tips, etc.) accessible to the sales representative user via navigation links or the like. The activities presented in the playbook section can be contextually matched to the current sales stage. For example, contextual logic built into or otherwise associated with a playbook can detect and understand the context of actions that have been completed in a renewal sales process, upcoming actions that need to be completed, people or roles responsible for the upcoming actions, etc. Activities can also be configured to work with other information related to the opportunity, and can access multiple data objects in a recurring revenue asset data model. A playbook can include a series of stages, one or more of which can include sub-stages, and can be thought of as a series of best practice activities and sub-activities defined to guide a user through a sales process (or other process) in an optimized manner. The guidance and suggested next activities can be dynamically modified by the playbook based on context derived from one or more data objects in a recurring revenue asset data model that are participating in the playbook. Playbooks need not apply only to opportunity handling, but can also define a series of activities (e.g. stages and sub-stages) related to other processes, such as for example data intake (e.g. from external data sources or the like), data verification, etc.

A playbook can be general purpose and can apply across multiple data objects in a recurring revenue asset data model (an example of which is described in more detail below) with sub recipes for each data object that "participates" in the playbook. When applying a playbook, one or more attributes on a participating object or participating objects can be used to determine which is the correct playbook to apply.

As an illustrative example of operation of a playbook, a playbook can be defined for a strategic account in a particular sales period (e.g. Q4 of 2013 or any arbitrary year). A data analyst (which can be a defined role within the recurring revenue asset management application) can be associated with (e.g. have responsibility for) performing a series of activities (e.g. Activity A, Activity B, Activity C) for some assets as defined in the playbook. The assets can be associated with respective asset data objects in the data model. Next in the playbook, a sales manager (e.g. another defined role) can be associated with one or more activities (e.g. Activity D, Activity E) defined in the playbook to be performed for opportunities generated from the assets worked on by the data analyst. These opportunities can be associated with respective opportunity data objects in the data model. Next in the playbook, a sales representative (e.g. another defined role) can work on the generated opportunities and therefore be associated with a set of activities (e.g. Activity F, Activity G) defined in the playbook. An operations associate (e.g. another defined role) can then perform processing of quotes and bookings (e.g. Activity H) associated with those opportunities. The quotes and billing can be associated with respective quote and billing objects in the data model.

The guidance provided by a playbook can adjust based on the context of completed activities and the attributes of the object or objects to which the playbook applies. For example, a playbook for an opportunity might be defined as a "120 days in advance normal sales cycle" playbook. At 30 days (or some other trigger time) from the expiration of the opportunity, the playbook can detect that insufficient progress (e.g. relative to some defined progress metric) has been taken. In response, the original playbook can invoke a different playbook with a different set of activities. Alternatively, the original playbook can include contingency logic that triggers the required different activities necessary to optimize the potential for successfully closing the opportunity despite the imminent expiration of the asset up for renewal.

In some implementations of the current subject matter, playbooks can be analyzed for success. In other words, one or more success metrics can be calculated for opportunities or types of opportunities handled using a playbook. As an illustrative example, a resolution rate for opportunities handled using the playbook can be compared to a resolution rate on similar opportunities including opportunities not handled using the playbook. In another example, another playbook applied to one or more types of assets can be determined to have resulted in an average data quality metric. This can be compared to a second average data quality metric including assets not handled using the playbook.

Consistent with some implementations of the current subject matter, focus categories can be used to group types of opportunities. This grouping of opportunities can be used to apply one or more relevant types of playbook. For example, a customer satisfaction focus category can have a defined customer satisfaction playbook, while a strategic customer category can have a strategic customer playbook. Playbooks can also be more or less narrowly defined than at the focus category level. For example, a playbook can be invoked based on any set of criteria relevant to the opportunity, and these criteria can optionally be applied against attributes of various data objects in the recurring revenue asset data model that relate to an opportunity (or to other types of scenarios to which playbooks can be applied).

A playbook can be configurable, for example by a sales manager, data analyst, administrator, or the like. As noted above, a playbook can define the activities and sub-activities for a given data object (e.g. opportunity, etc.) as a "recipe" or series of activities, recommendations, suggestions, guidance, etc. for the user. When creating or defining a playbook, a sales manager or other authorized user can define or access a playbook name and define main organization components of the playbook. For example, a playbook for an opportunity object can include the sales stages as its main organization components. The sales manager can determine the appropriate sales stages to include and also decide whether one or more standard stages should be omitted. As an example, a "Pre-quote" might display the following sales stages: quote completed, quote delivered, customer commitment, PO received, and closed, while a "Value" playbook might display the following sales stages: not contacted, contacted, quote requested, quote completed, quote delivered, customer commitment, PO received, and closed.

When defining a playbook, the sales manager can also identify the characteristics of the opportunities with which that particular playbook is associated. For example, as discussed above, one or more attributes of data objects associated with an opportunity can be applied against characteristics defined for one or more available playbook. A playbook having defined characteristics matching the attributes of the data objects associated with the opportunity can be applied to that opportunity.

The organization components of a playbook can include the sales stages of the associated opportunity object. Sub-components of a playbook can include text, attachments (e.g., .pdf, .xls, .ppt, video, etc.), hyperlinks, visual features to indicate a completion stage of the various activities and sub-activities, context, etc. Context refers to identifying the state of an object, such as for example an opportunity object, along the sequence of activities and sub-activities outlined in the playbook and display the next activities based on that context, etc. A playbook can be applied to any object in the system or combination of objects in the system. Playbooks can be used in conjunction with a variety of objects in an asset data model, such as for example opportunities, quotes, bookings, assets, customer records, etc.

Playbooks can be assigned such that one default playbook is displayed per object per each tenant of a multi-tenant (e.g. "software as a service" or cloud-based) software offering supporting a number of customers.

Figure 5:
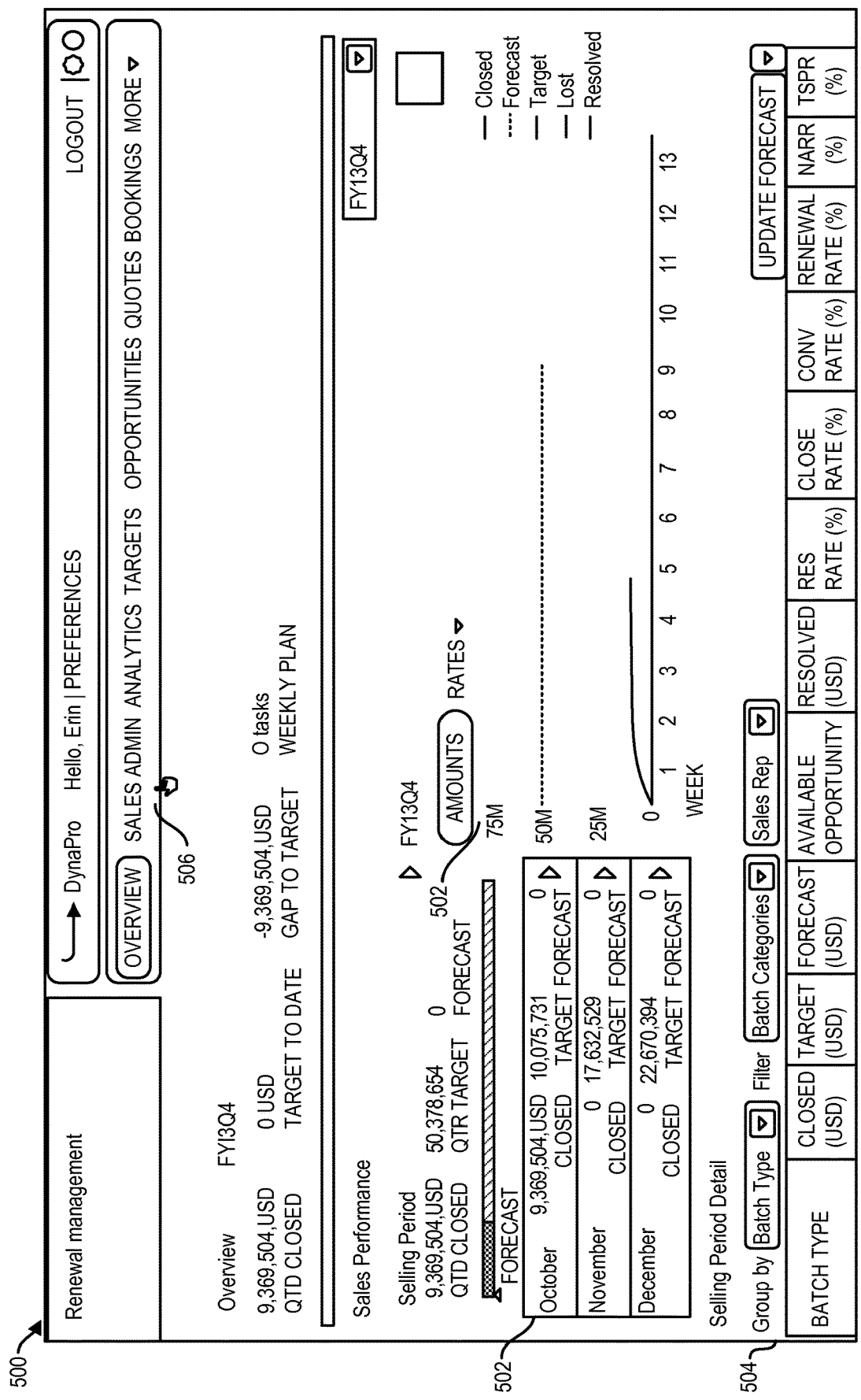

FIG. 5 shows screenshot view 500 illustrating features of a dashboard or overview screen tailored to a manager user (e.g. someone with supervisory responsibility for a team of one or more sales representative users). The screen can display one or more sales performance graphics 502 showing closed, target, and forecast results based on a current sales status of opportunities assigned to members of the manager user's sales team.

Figure 6:
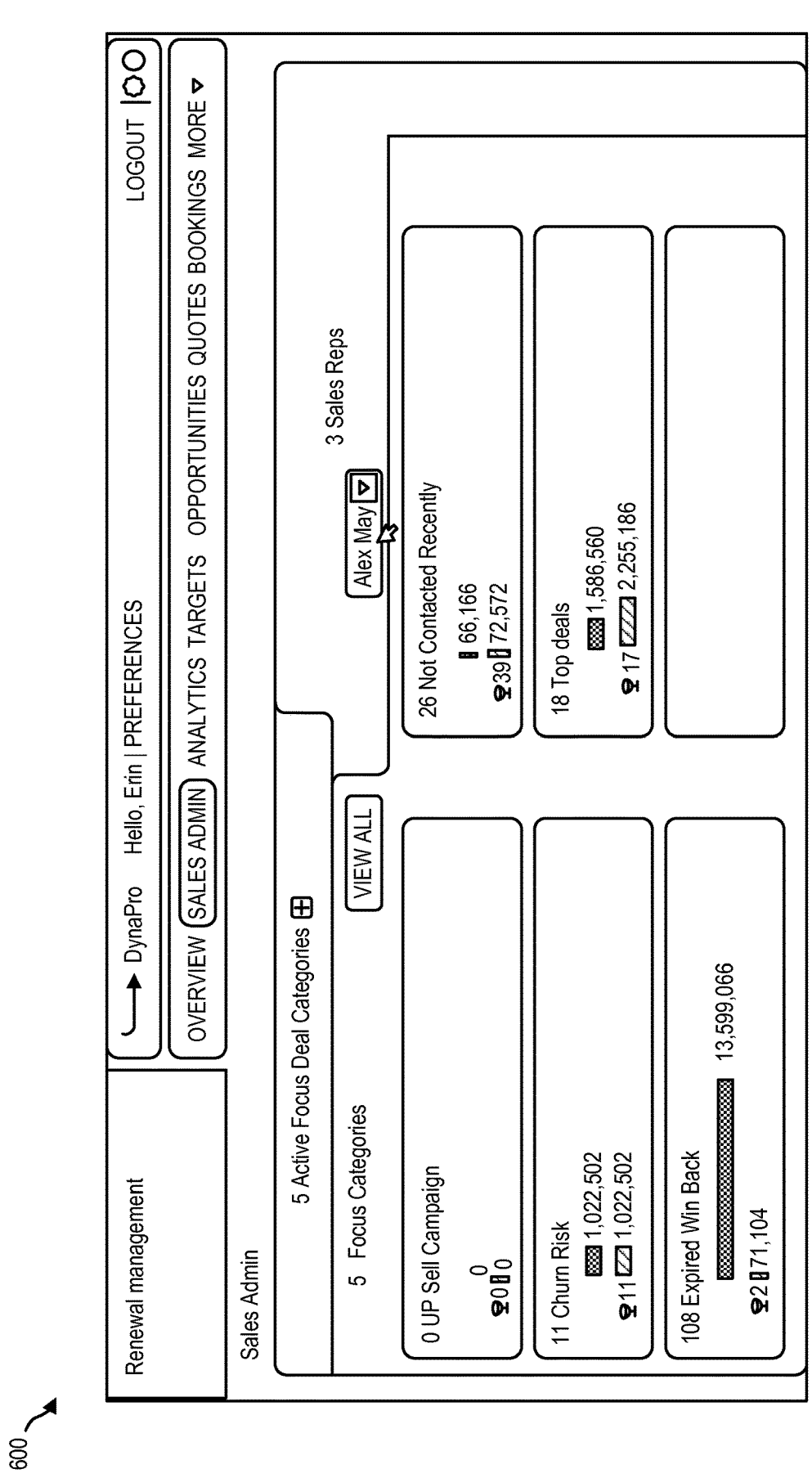

A manager can also have access to a sales administration screen, for example through a toolbar 506 displayed on user interface screens. The sales administration screen, an example of which is shown in the screenshot view 600 of FIG. 6, can enable the manager to perform various administrative tasks relating to focus categories and/or playbooks. In FIG. 6, the focus categories are displayed. The manager can drag and drop these focus category icons to rearrange an order in which the focus categories are prioritized. Other approaches to re-ordering the focus categories (e.g. a pull-down menu, numerical ranking entry fields, etc.) are also within the scope of this disclosure. When the focus categories are re-ordered via a sales administration screen, the changed priorities are pushed out to sales representative user members of the manager's sales team. This re-ordering can optionally be reflected at a next screen refresh performed by the sales representative users. As with the sales representative user focus category view shown in the focus category section 106 of FIG. 1, the sales administration focus category representation can also include a count of opportunities in each category as well as revenue from closed opportunities in the sales period and a target to date revenue value for the sales period.

A manager can also define focus categories. This can be accomplished by defining a focus category name, one or more sales representative users to whom the focus category applies, one or more search criteria or parameters for defining which opportunities are included within the focus category, one or more success criteria to define how an opportunity can move from one state in a focus category to another, etc. Assignment of sales representative users to focus categories can also be changed, as can the search criteria for determining which opportunities are included within the focus category and how an opportunity moves between states in the focus category. Consistent with implementations of the current subject matter, focus categories can be readily administered by non-technical users, such as a manager or sales administrator.

Figure 7:
Figure 8:
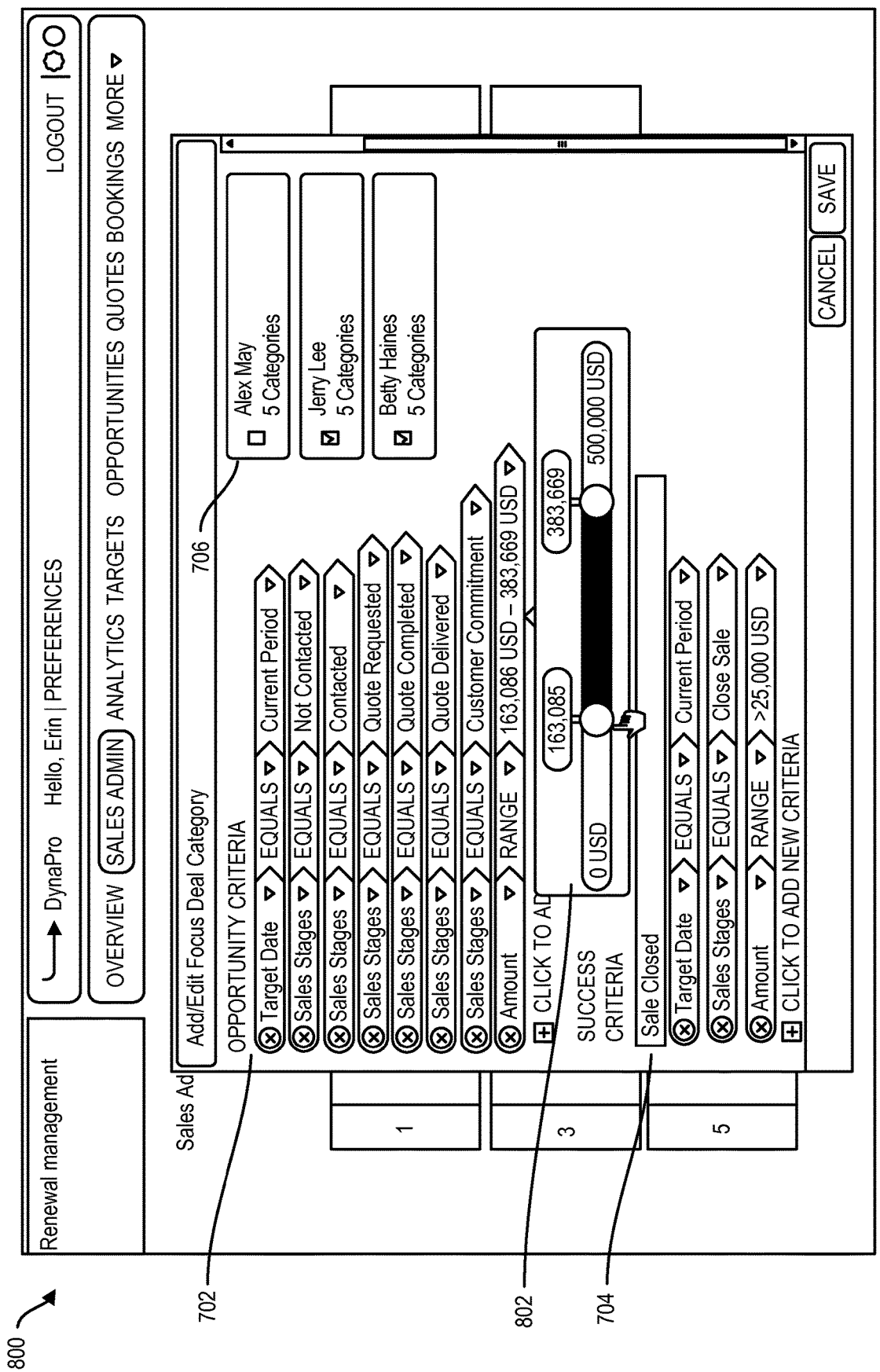

FIG. 7 shows a screenshot view 700 of a user interface screen via which a manager or other administrative user can add or edit a focus category. Opportunity criteria 702 can optionally be defined in a graphical manner, with criteria being added or deleted by respective controls. Values for the opportunity criteria can be set by a slider control 802 as shown in the screenshot view 800 of FIG. 8 or by other approaches (e.g., numerical entry, scroll wheels, etc.). Opportunity criteria define the types of opportunities contained in the focus category, such as for example 'opportunities in sales stage "Quote Requested" where Amount is greater than $30,000." Success criteria define the criteria by which an opportunity moves out of the category. For example, Opportunities in Sales stage "Quote Delivered" where Amount is greater than $30,000. Success criteria 704 can be added, deleted, edited, etc. in a similar manner to opportunity criteria.

The focus category administration screen can display how many reps are assigned to each category and a description on what the category is used for. For example, an assignment control 706 can allow the manager to choose one or more sales representative users to be assigned to the focus category. Those sales representative users who are assigned to a focus category will be able to view the focus category in their focus category section 106. Other sales representative users who are not assigned to the focus category will not have it visible in the focus category section 106. In some examples, it can be advantageous to allow tagging of opportunities to a given focus category once they have been initially placed there given that an opportunity may move out of an initial criteria range for various reasons.

An example focus category definition can include: "top deals over $25K" (or some other value) per sales rep for this selling period, the value can serve as a filter criteria while success criteria can include count and revenue amount of the closed opportunities. Another example of a focus category, can be "deals under $5 k in a sales stage of Not Contacted" (this is the filter criteria). Success criteria for this focus category can be count and amount of those that have moved a sales stage this week (or other period). Still another example of a focus category is "deals that have not been touched in the last 2 weeks". Search criteria can include "last modified date" while success criteria can include count and amount of those that have an activity logged against them or those opportunities that have a new note posted to them or possibly the last modified date has changed that week. Other focus category examples can include "deals with follow up tasks" (search criteria can be count and amount of specific deals while success criteria can include count and amount of those where the specific follow up task was completed that week), "deals to be quoted" (search criteria can include count and amount of specific deals, which be tagged by the manager or use some criteria like expiration date and amount, and success criteria can include count and amount of those that move to quote completed or delivered stages).

Allowing definition, configuration, assignment, and prioritization of a set of focus categories can allow a manger to quickly and dynamically update instructions to his or her sales representative users by setting and distributing organizational priorities for the sales representative team without requiring in person meetings or the like. Additionally, because the updated prioritization and assignment is quickly pushed to the same user interface with which the sales representative user interacts in conducting day to day activities, implementation of new priorities or target task can occur quickly and seamlessly. The sales administration screen can also allow the manager to "ghost" or otherwise see what the sales representative user would see on his or her screen. The ability to make focus category assignments per sales representative user or group of sales representative users can allow the manager to see and make changes territory by territory, sales representative by sales representative, time window by time window, within time windows, etc.

In further implementations of the current subject matter, focus categories can apply to data object other than those corresponding to opportunities. For example, a focus category can be configured (e.g. defined, added, edited, etc.) to apply to other data objects that allow sales and enablement supervisors better manage their teams. An enablement supervisor can use focus categories to prioritize a subset of tasks, such as quotes and bookings requests.

Figure 9:
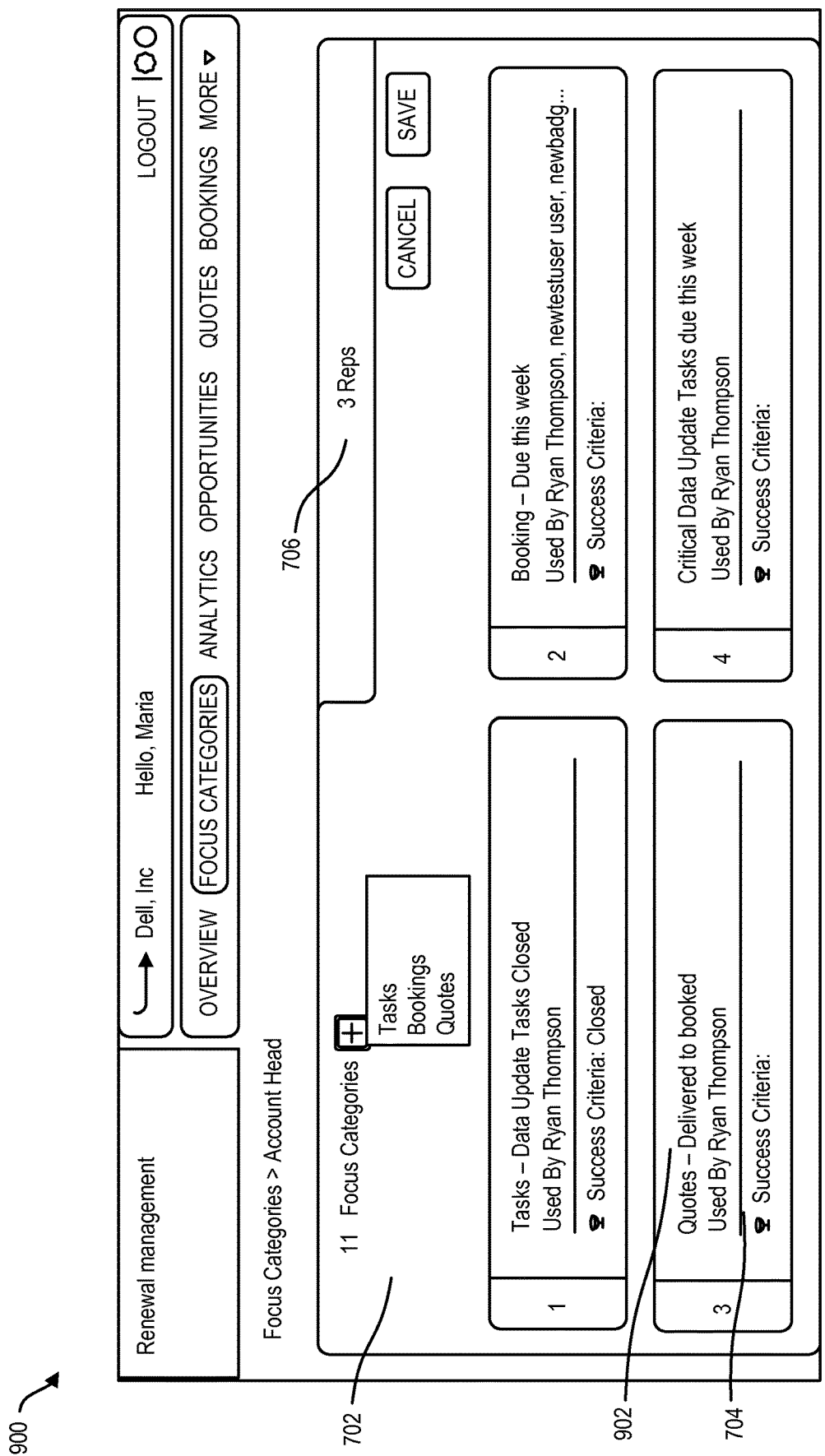

A sales operations manager can also be provided access to a focus categories setup screen that allows for the configuration of these items as shown in the screenshot 900 of FIG. 9. FIG. 10 shows a screenshot 1000 illustrating features of a sales operations representative dashboard that displays these focus categories as well as to do tasks/items, and the like.

FIG. 11 shows a process flow chart illustrating example features that can be included in a method consistent with implementations of the current subject matter. At 1102, a computing system receives from a first user, via a first graphical user interface, a prioritization of a focus category and an assignment of the focus category to a second user. The first user can also optionally modify or create a focus category definition that applies to a subset of renewal sales opportunities managed by a recurring revenue asset management application and includes one or more configurable criteria, parameters, etc. defining those opportunities that are within the subset.

At 1104, the computing system can cause a second graphical user interface displayed to the second user to include a focus category user interface element corresponding to the focus category and to reflect the prioritization of the focus category relative to one or more other focus categories assigned to the second user, for example by positioning of the focus category user interface element relative to other focus category user interface elements corresponding to the one or more other focus categories. The focus category user interface element can include a visual indication of a status of opportunities in the subset of opportunities that fit the focus category definition. Optionally, the status can include those opportunities in the subset with which the second user is associated (e.g. has sales responsibility). Alternatively or in addition, the status can include all opportunities in the subset, all opportunities in the subset with which other members of the second user's sales team are associated, etc.

At 1106, upon detection by the computing system of a selection by the second user of a navigation element in the focus category user interface element, the computing causes display in the second graphical user interface of a playbook including stages and sub-stages of a renewal sales process to guide the second user through suggested next steps for moving an opportunity in the subset of opportunities toward a successful closing during a target time period.

At 1110, the computing system can cause a third graphical user interface displayed to a third user to which the focus category is not assigned to not include the focus category user interface element corresponding to the focus category.

FIG. 12 shows a process flow chart illustrating example features that can be included in a method consistent with implementations of the current subject matter. At 1202, a computing system compares attributes of one or more data objects associated with an opportunity (e.g. a renewal sales opportunity) to a set of defined characteristics for a playbook. The playbook includes a configurable set of actions to be performed by one or more users to bring the opportunity to a successful resolution.

At 1204, the computing system causes a graphical user interface displayed to a user of the one or more users to indicate a suggested future action (or suggested future actions) to be performed by the user in association with the opportunity.

At 1206, the computing system detects a change in context of the one or more data objects associated with the opportunity and, in response, at 1210 cause the graphical user interface displayed to the user to reflect at least one different suggested future action. The change in context that triggers the change in the at least one suggested future action can be a defined characteristic of the playbook. The different suggested future action or actions can also be included within the playbook, or alternatively in another playbook that is invoked upon the detecting of the triggering change in context. Changes in context can include any attribute of any of the associated data objects, such as for example a change in sales stage, a time to expiration, an associated revenue amount, a change in prioritization of the opportunity caused by rearrangement of an focus category to which the opportunity is associated, etc.

Figure 13:
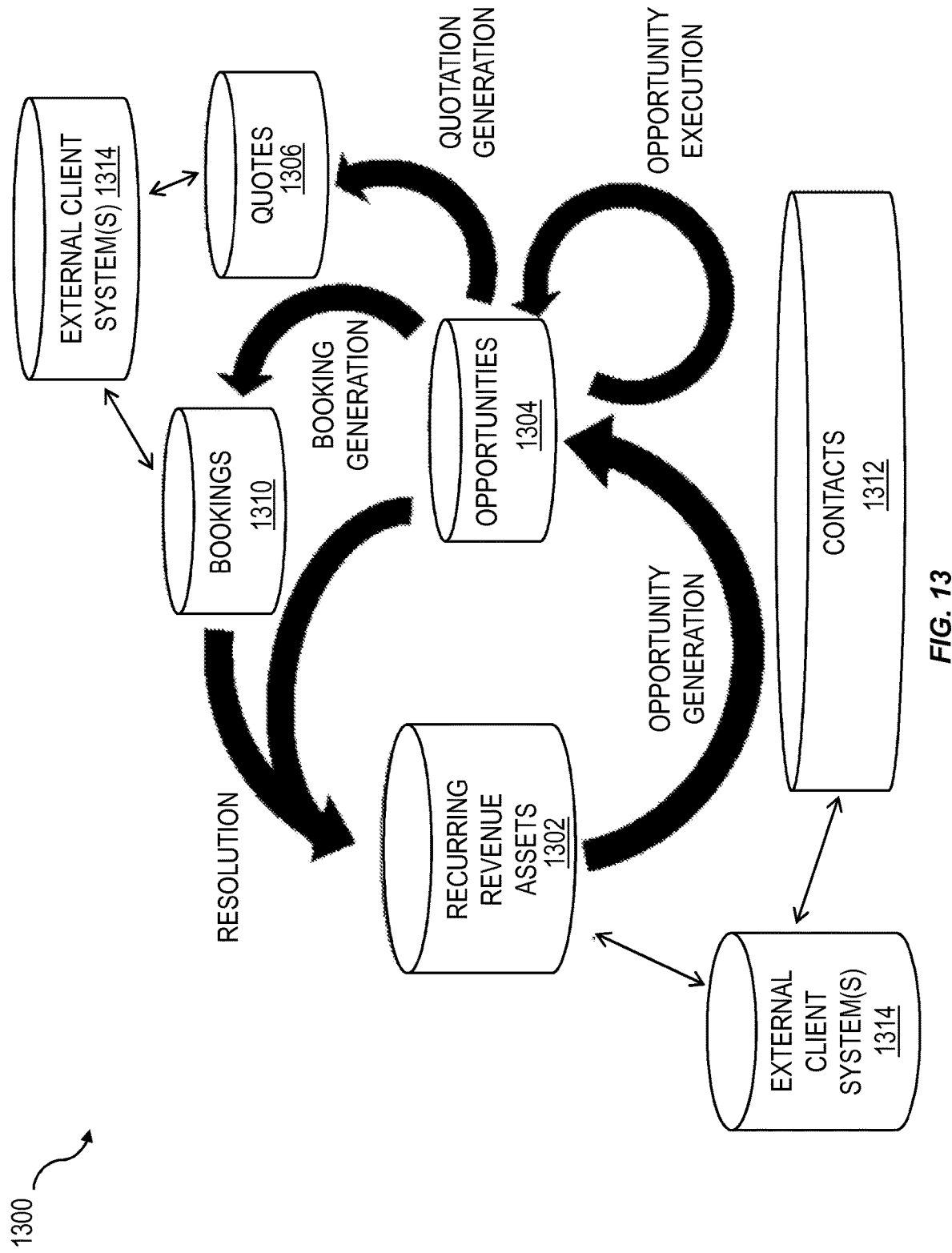
FIG. 13 shows a diagram illustrating examples of data flows in a recurring revenue management framework consistent with implementations of the current subject matter.

FIG. 13 shows a diagram 1300 showing examples of data flows occurring in a recurring revenue management system consistent with implementations of the current subject matter. As shown in FIG. 13, multiple data sources can contribute data that are included within an asset data model, which can include recurring revenue assets information in a recurring revenue assets repository 1302, opportunity and/or offer information in an opportunities repository 1304, quotation information in a quotations repository 1306, bookings information in a bookings repository 1310, contacts information in a contacts repository 1312, and the like. It should be noted that while various repositories in FIG. 13 are depicted as physically separate from one another, any data storage configuration and arrangement of one or more repositories is within the scope of the current subject matter. For example, all or some of the repositories 1302, 1304, 1306, 1310, 1312 in FIG. 13 can be included within a single repository structure, which can be hosted at a single storage facility or alternatively in distributed storage (e.g. in the "cloud").

Referring again to FIG. 13, the recurring revenue assets repository 1302 can include information about instances of covered assets (e.g. products such as physical items or software licenses, etc. that can be sold by a commercial entity to one or more customers of the commercial entity, which are also referred to herein as covered assets) that have been sold. These covered assets form the basis for recurring revenue assets because they constitute an existing instance of a seller-purchaser relationship between the commercial entity and the customer who purchased the covered assets. The recurring revenue assets (service assets) themselves can include, among other assets, service contracts, warranties, maintenance agreements, and the like sold by the commercial entity to the customer in association with or to provide an ongoing service arrangement for the covered assets.

Because it relates to an existing and ongoing relationship with the customer, the information about products and their associated recurring revenue assets that is contained in the recurring revenue assets repository 1302 can be used to generate one or more opportunities for renewal of an existing recurring revenue asset (to thereby maintain the recurring revenue stream) and in some cases to increase the value of the recurring revenue asset (for example by selling a higher value agreement, service contract, etc. to the customer). Opportunities can be collected in the opportunity repository 1304.

Once acted upon by sales staff who make contact with appropriate decision makers at the customer, opportunities can be moved into a quotation stage during which quotations related to renewals, increases, etc. of existing recurring revenue assets can be generated. Quotations, which include a transaction offer for a set of offers included in an opportunity, can be stored in the quotation repository 1306. As a quotation is transitioned to a deal being closed, a booking, which refers to a set of offers accepted by a customer, can be generated and stored in a bookings repository 1310. Resolution of a booking results in generation of a new recurring revenue asset, which can be retained in the recurring revenue asset repository 1302 for use in generating future offers and opportunities. For example, when a resolved service contract or the like approaches its next expiration, a new offer for renewal of that service contract can be generated and optionally grouped with other offers for the same customer with similarly timed expiration dates into a new opportunity. Additional data that impact the generation of opportunities and execution of those opportunities includes contact information for the decision makers and other important contacts (e.g. individuals and companies involved in the sales process) with whom sales staff need to communicate. This contact information can be stored in the contacts repository 1312.

Efficient and structured assembly of the information contained in the repositories 1302, 1304, 1306, 1310, 1312 depicted in FIG. 13 can be an important aspect of a recurring revenue management approach consistent with implementations of the current subject matter. However, much of this information is typically contained (or at least originates) in other data management systems (referred to herein as external client systems 1314) than the recurring revenue management system, as discussed in greater detail below in reference to FIG. 14. The term "client" is used herein to refer to a commercial entity that employs features or functions of a recurring revenue management system provided or supported by a recurring revenue management vendor or service provider. Effectively, as used herein, the client is a commercial entity that is a customer of the recurring revenue management vendor or service provider. The client commercial entity in turn has customers to whom the client has sold and/or wishes to sell or renew recurring revenue assets such as those described elsewhere herein. A customer of a client commercial entity typically has an installed base of products, for which the customer can purchase various service agreements, contracts, etc. In effect, the products in the installed base of products can be considered as covered assets for which the commercial entity can sell to the customer one or more service contracts, agreements, etc.

From the perspective of the client commercial entity, these service contracts, agreements, etc. can be considered to be service assets or recurring revenue assets.

A recurring revenue management approach consistent with implementations of the current subject matter can be configurable for the storage, retrieval, searching, and analysis of a wide range of recurring revenue information. Data relating to service assets or other recurring revenue assets, referred to herein as "recurring revenue data," can include information pertaining to what a commercial entity has sold, such as for example services, products for which related services can be sold, etc. (e.g. the covered assets). Recurring revenue data can also include information about the purchasers, users, locations of use, modes of use, etc. of such services, serviceable products, etc. In other words, the recurring revenue data can include information about what recurring revenue assets an entity has, who the customers and users of the recurring revenue assets are, and where and how the recurring revenue assets are being used. Recurring revenue data can further include metrics relating to satisfaction of the customer or user of the recurring revenue asset, as well as information relating to potential opportunities for services contract sales (e.g. for serviceable products soon to come off warranty, etc.), and the like.

The recurring revenue management system can import diverse information, and of various formats, from external client systems 1314 into a common asset data model. The asset data model can facilitate a wide range of recurring revenue management capabilities, and can provide automated assistance for entity resolution (resolving external entities to pre-existing entities in the system). The recurring revenue management system can also optionally maintain provenance information for all information loaded into the system (e.g. all recurring revenue data from each of the one or more data sources) to be able to discern information origin.

Figure 14:
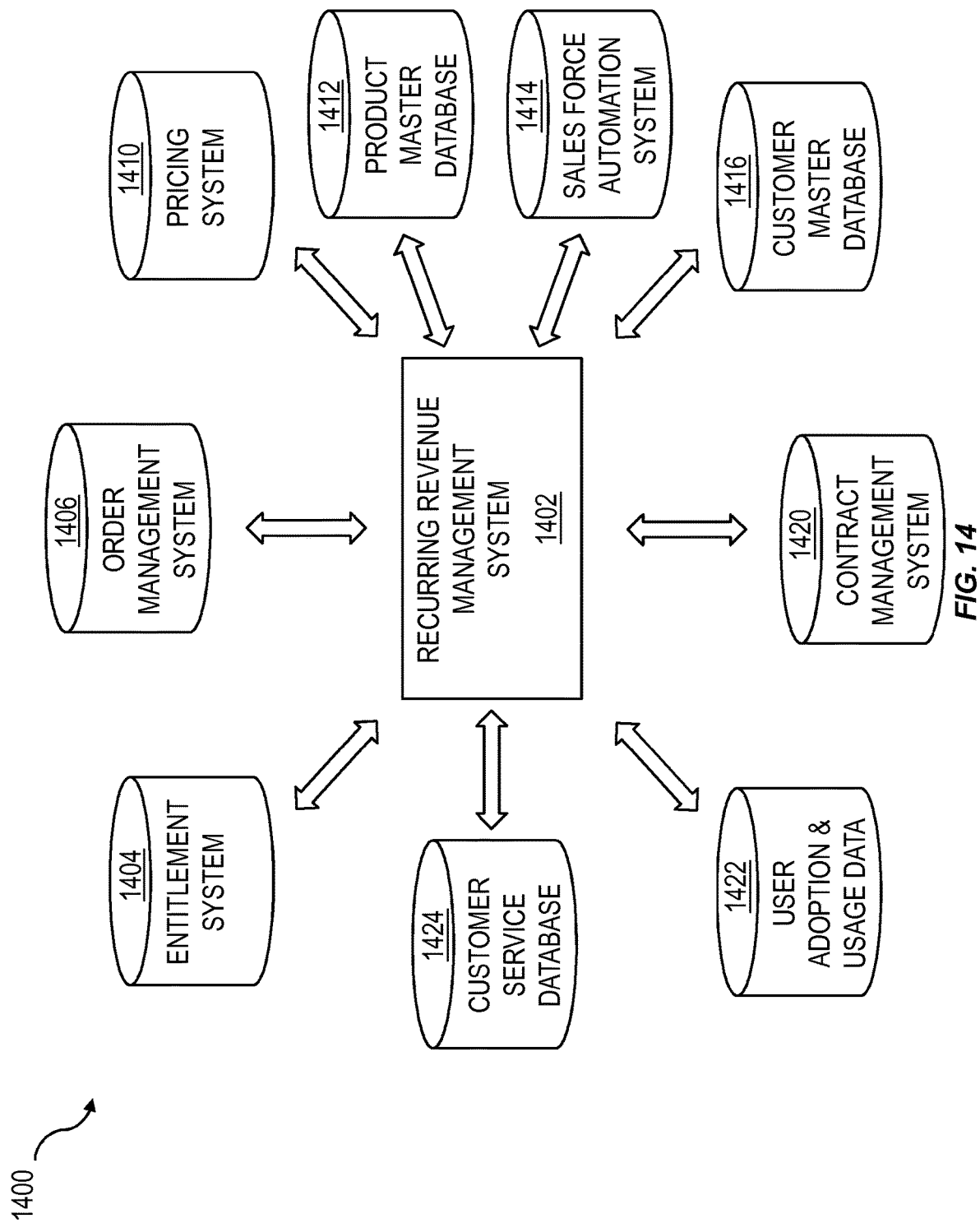
FIG. 14 shows a diagram illustrating example data exchanges between a recurring revenue management system consistent with implementations of the current subject matter and examples of external client systems.

As noted above in reference to FIG. 13, a recurring revenue management system consistent with implementations of the current subject matter can receive and assign a usable structure to information obtained from a variety of external clients systems 1314. FIG. 14 shows a diagram 1400 illustrating potential sources of data or other information that can be acquired by or received at a recurring revenue management system 1402. Among other possible data sources, the external client systems 1314 referenced in FIG. 13 can include one or more of an entitlement system 1404, an order management system 1406, a pricing system 1410, a product master database 1412, a sales force automation system 1414, a customer master database 1416, a contract management system 1420, user adoption and usage data sources 1422, a customer service database 1424, and the like. It will be understood that the individual external client systems shown in FIG. 14 can, in some implementations of the current subject matter, be provided by one or more systems that support features of more than one such external client system 1314. For example, external client systems can include customer relationship management (CRM) systems, enterprise resource planning (ERP) systems, business intelligence (BI) systems, calendar and contact systems or databases, customer service systems, inventory systems, accounts receivable systems, sources of customer usage and engagement information, and the like. In general, a commercial entity acquires these various systems, databases, and the like from more than one different software or computing system provider, each of which typically uses distinct or proprietary database structures, data formats, report configurations, application programming interfaces (APIs), and the like that are optimized for the specific tasks to be performed by its product. Assembly of information from a group of data sources with multiple, potentially disparate database structures and data formats can present a challenge for any system that seeks to collect such information, present it in a usable format, support detailed analytics based on the data, etc. Further challenges can be presented by the need to authenticate potentially conflicting information received from more than one source. Additionally, information collected in a recurring revenue management system consistent with implementations of the current subject matter is typically not static. Rather, users interacting with the system are likely to update or correct the information based on communications with contacts, etc. Execution of tasks depicted in FIG. 14 can also alter the "correct" version of some of the information received into the recurring revenue management system.

An approach to this problem typically involves receipt of the data at the recipient system from a source system, creation of customized mappings (or application of pre-created mappings) between data structures of each source system and the data structures of the recipient system, and transformation of the data from the source system data structures to the recipient system data structures according to the mappings. Subsequent to import of data from the data sources but prior to making the imported data available for productive use by end users at the recipient system, one or more quality control operations generally occur to ensure consistency of the imported data; to identify duplicate and potentially conflicting records; and to alert one or more users with appropriate permissions levels to the presence of any errors, partial imports, missing data, or the like. For export of data from the recipient system back to the source system, a similar process can be undertaken, with the mapping being performed in reverse.

For an active recurring revenue management system, particularly one supporting recurring revenue asset management for a large commercial entity with a sizable sales staff, a large number of recurring revenue assets, and a complicated information landscape in which multiple systems maintain data records relevant to support of recurring revenue management activities, a quality control process that interrupts productive use of the system subsequent to a data import is not desirable. For example, in a large enterprise with multiple data streams, quality control could be quite time consuming. Additionally, in the interest of having the most current information available for use by the recurring revenue management system, frequent data imports can be advantageous. However, if each such import were to require substantial downtime for the import and transformation processes to complete and quality assurance routines to execute, usability of features supported by the recurring revenue management system would be negatively impacted.

A recurring revenue management approach consistent with implementations of the current subject matter can include synchronization and integration of data with a variety of disparate external client systems. For example a recurring revenue management system can access data records and formatted data from systems such as entitlement systems, order management systems, customer master systems, product master systems, and service delivery systems. The data from these external client systems is usually not static. Accordingly, it is advantageous for the recurring revenue management system to be able to receive data feeds from such systems at a high throughput rate. Furthermore, the received data is usable either upon receipt at the recurring revenue management system or at least within a very short processing time.

Figure 15:
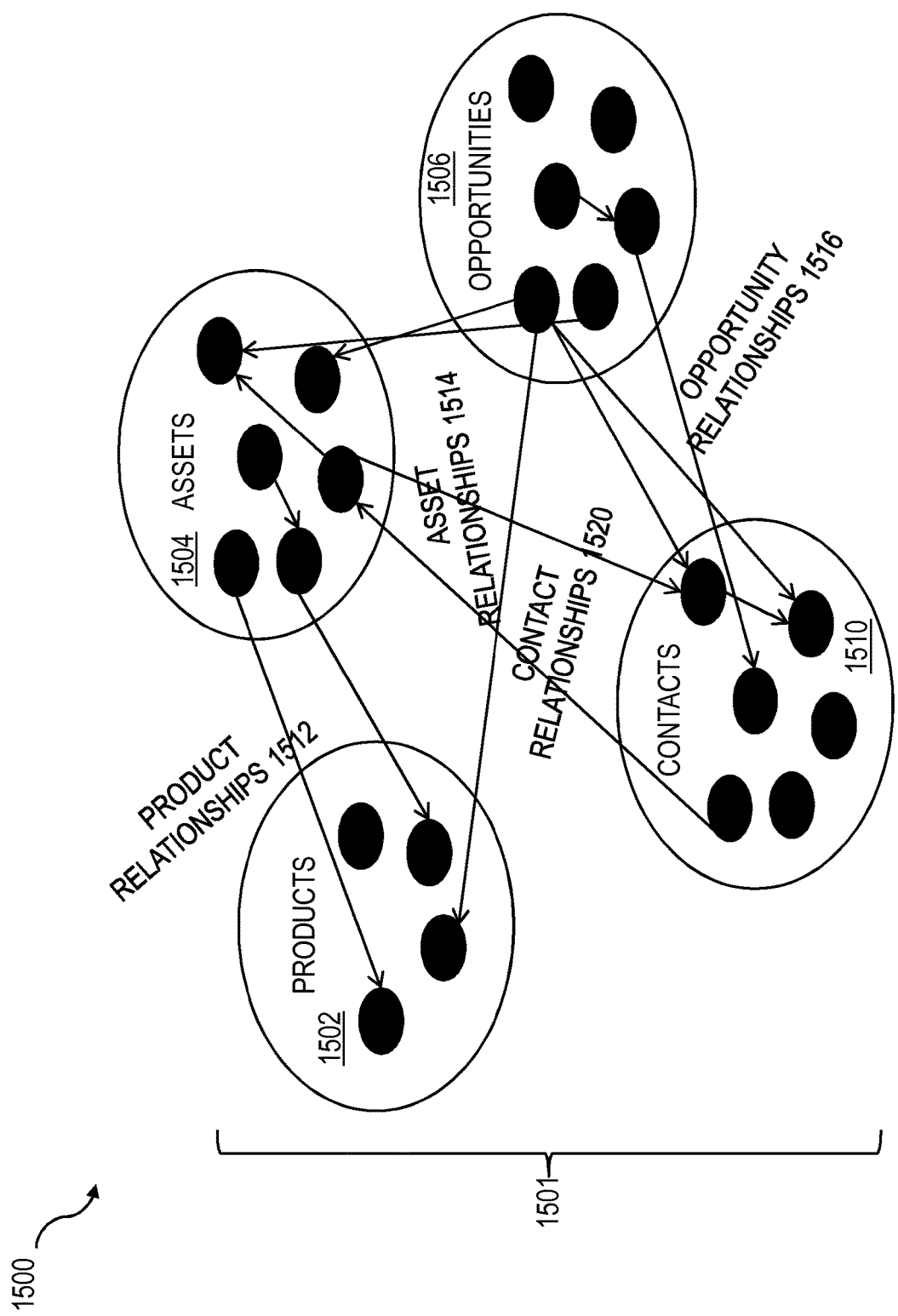
FIG. 15 shows a diagram illustrating example features of an asset data model consistent with implementations of the current subject matter.

FIG. 15 illustrates features of an asset data model 1500 that can include interrelated data objects 1501 that support the recurring revenue management features and functions described elsewhere herein. The recurring revenue management system 1502 can support an asset data model 1500 as a flexible mechanism for representing complex relationships among assets, organizations, people, and products, and on which a number of analytics and business intelligence processes can be executed. The recurring revenue management system can provide one or more application programming interfaces (APIs) or other standardized interface to access service renewal assets in the recurring revenue repository, and the recurring revenue repository information model used by the repository provides a uniform means of analyzing, searching, and manipulating recurring revenue data.

Consistent with implementations of the current subject matter, a recurring revenue management system 1402 and an included asset data model 1500 can include product data objects 1502, recurring revenue asset data objects 1504, opportunity data objects 1506, and contact data objects 1510. Product data objects 1502 represent products (e.g. covered assets), which as noted above in reference to FIG. 13, can include items sold to customers and can be considered as part of the customer's installed base of covered assets. A framework of data objects 1501 can include a set of common relationships related to recurring revenue management, these relationships can include product relationships 1512, asset relationships 1514, opportunity relationships 1516, and contact relationships 1520. Products can provide the basis for a recurring revenue assets represented by instances of asset data objects 1504 via one or more product relationships 1512 between a product represented by a product data object 1502 and the instances of an asset data object 1504 representing the recurring revenue asset or assets. Product relationships 1512 can also optionally exist between product represented by a product data object 1502 and one or more of recurring revenue assets represented by instances of asset data objects 1504, opportunities represented by instances of opportunity data objects 1506, contacts represented by instances of contact objects 1510, other products represented by other instances of a product data object 1502, etc.

Further with reference to FIG. 15, asset relationships 1514 can exist between a recurring revenue asset represented by an instance of an asset data object 1504 and one or more of a product represented by an instance of a product data object 1502, a contact represented by an instance of a contact data object 1510 (e.g. a person, organization, etc. relevant to a recurring revenue asset), an opportunity represented by an instance of an opportunity data object 1506 (e.g. a bundle of offers relating to renewal of existing recurring revenue streams and/or to establishment of new or increased value recurring revenue streams), another recurring revenue asset represented by another instance of an asset data object 1504, etc.

Opportunity relationships can exist between an opportunity represented by an instance of an opportunity data object 1506 and one or more of a specific recurring revenue asset represented by an instance of an asset data objects 1504, a product represented by an instance of a product data object 1502 underlying the recurring revenue asset(s), a contact represented by another instance of a contact data objects 1510, another opportunity represented an instance of an opportunity data object 1506, etc. Contact relationships can exist between a contact represented by an instance of a contact data object 1510 and one or more of a recurring revenue asset represented by an instance of an asset data object 1504 (for example based on communications relating to an initial sale of a recurring revenue asset 1504 and/or to one or more renewals of the recurring revenue asset 1504), a product represented by an instance of a product data object 1502 underlying the recurring revenue asset(s), an opportunity represented by an instance of an opportunity data object 1506, another contact represented by another instance of a contact data object 1510, etc.

The data objects 1308 discussed above can optionally also be extendible, for example through customer-specific extensions fields. Additional custom objects can be added to a customer's configuration. In addition, the set of base relationships can be extended to match specific requirements of the commercial entity using the recurring revenue management system 1402. Relationships between an instance of the product data object 1502, the asset data object 1504, the opportunity data object, and the contact data object can be established based on one or more of the data received from the incoming data streams, existing data in the recurring revenue management system 1402, user input, and the like. The instances of the data objects 1501 and the defined relationships between these instances together make up the asset data model 1500.

An asset data model 1500 such as that described herein can provide a useful vehicle for exploring and understanding relationships that exist among product objects, asset objects, organization objects, contact objects, and opportunity objects. Many of these relationships are directly derived from information that exists in source client systems, while others require inference on the part of the system, others are generated by the system as part of object generation, others are created as a side effect of system actions, and still others are constructed as a result of actions by system users. In an illustrative but not limiting example of an inference approach to generation of the relationships between objects, a relationship inference includes exploitation of transitivity (e.g. if a relates to b, and b relates to c, a relationship can be instantiated between a to c), and an automated instantiation of inverse relationships (if a relates to b, then there exists an inverse relationship from b to a).

Through the asset data model 1500, a clearer view can be presented to users (e.g. sales staff, sales support staff, managers, executives, etc.) of the installed base of products, services, etc. that have been previously sold to customers of the commercial entity and that provide the foundation for new and renewal sales of recurring revenue assets. As discussed elsewhere herein, the clearer view can be presented to users via one or more user interface displays, computer-generated interfaces, or the like. Management of this installed base using an asset data model 1500 can improve accuracy and insight into the customer base and enable leveraging of this installed base data to maximize recurring revenue streams. Increased sales can be achieved through improved quote accuracy, consolidation, identification of cross-sell and up-sell opportunities, better handling of renewal contacts and processes, and the like. Service delivery efficiency and customer satisfaction can be increased through improved entitlement, shipping, and staffing resource planning. Prediction of customer behavior can also improve, which can facilitate optimization of sales staff activities.

Figure 16:
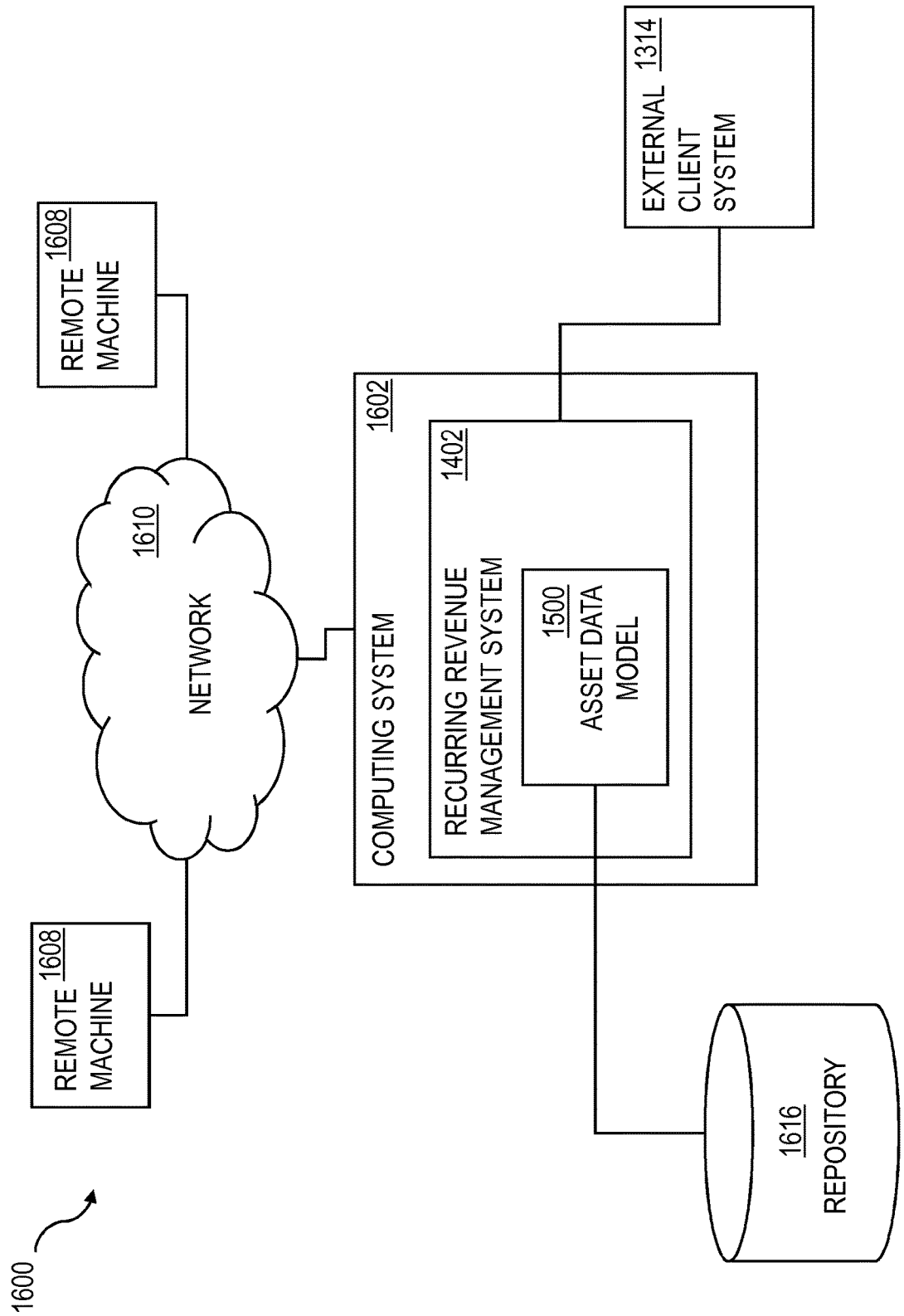
FIG. 16 shows an example of a computing landscape having one or more features that can be included in implementations of the current subject matter.

FIG. 16 shows a diagram of a computing landscape consistent with one or more implementations of the current subject matter. A computing system 1602 can perform operations, execute code, or otherwise implement a recurring revenue management system 1402. The recurring revenue management system 1402, which can include a asset data model 1500, provides one or more features as discussed above. The computing system 1602 can be accessed by one or more remote machines 1608, for example via a direct connection, a local terminal, or over a network 2010 (e.g. a local area network, a wide area network, a wireless network, the Internet, or the like). External client systems 1314 can also be accessed via direct connections and/or over the same network 1610 or one or more other networks. The asset data model 1500 and recurring revenue management system 1402 can be in contact with one or more repositories 1616, again either via direct connection and/or over the same network 1610 or one or more other networks. Aspects of the current subject matter can also be provided via a multi-tenant environment, in which data records, etc. of multiple client organizations are retained on a common repository or set of repositories while being isolated from access except by the owner of the specific data records, etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable storage medium storing instructions that, when executed by one or more programmable processors, cause the one or more programmable processors to perform operations comprising:

comparing a plurality of attributes of each of a plurality of data objects associated with a renewal sales opportunity to a plurality of defined characteristics for a playbook of a plurality of playbooks, the plurality of attributes defining a focus category for each data object, each playbook comprising a plurality of stages of a renewal sales process, one or more of the plurality of stages further comprising one or more sub-stages, each stage and sub-stage comprising a configurable sequence of actions for moving the renewal sales opportunity toward a successful closing during a target time period;

selecting the playbook from the plurality of playbooks for use with the renewal sales opportunity based on the comparing;

selecting a user of a plurality of users based on the focus category for the renewal sales opportunity and a priority assigned to the focus category;

causing a graphical user interface displayed to the selected user to indicate a sequence of one or more suggested future actions to be performed by the user in association with the renewal sales opportunity, the sequence of one or more suggested future actions being defined by the playbook based on a current context of one or more data object instances associated with the renewal sales opportunity, wherein the current context of the one or more data object instances is based on completed actions in the sequence of actions in each stage and sub-stage of the selected playbook;

detecting a change in the current context of one or more of the plurality of data objects; and causing, in response to the detecting of the change in the context, the graphical user interface displayed to the selected user to reflect at least one different suggested future action.

2. A computer program product as in claim 1, wherein the at least one different suggested future action is defined by the playbook.

3. A computer program product as in claim 1, wherein the at least one different suggested future action is defined by a second playbook, and wherein the operation comprise selecting the second playbook based on the change in the current context.

4. A computer program product as in claim 1, wherein the data objects are part of an asset data model comprising a flexible mechanism for representing complex relationships among assets, organizations, people, and products; and wherein the data objects comprise product object instances representing products upon which recurring revenue assets are based, asset object instances representing the recurring revenue assets, opportunity object instances representing opportunities for renewal of the recurring revenue assets, and contact object instances representing contacts relating to one or more other data objects in the asset data model.

5. A computer program product as in claim 4, wherein the playbook comprises contextual logic that detects and understands impacts of completed actions in the renewal sales process on the current context of the one or more data object instances, and wherein the at least one different suggested future action is determined based on the contextual logic.

6. A computer program product as in claim 5, wherein the current context comprises a state of one or more data objects of the plurality of data objects relative to a time defined in the playbook.

7. A computer program product as in claim 1, wherein selecting of the playbook comprises determining that the playbook has defined characteristics matching the attributes of the data objects.

8. A computer-implemented method comprising:

comparing a plurality of attributes of each of a plurality of data objects associated with a renewal sales opportunity to a plurality of defined characteristics for a playbook of a plurality of playbooks, the plurality of attributes defining a focus category for each data object, each playbook comprising a plurality of stages of a renewal sales process, one or more of the plurality of stages further comprising one or more sub-stages, each stage and sub-stage comprising a configurable sequence of actions for moving the renewal sales opportunity toward a successful closing during a target time period;

selecting the playbook from the plurality of playbooks for use with the renewal sales opportunity based on the comparing;

selecting a user of a plurality of users based on the focus category for the renewal sales opportunity and a priority assigned to the focus category;

causing a graphical user interface displayed to the selected user to indicate a sequence of one or more suggested future actions to be performed by the user in association with the renewal sales opportunity, the sequence of one or more suggested future actions being defined by the playbook based on a current context of one or more data object instances associated with the renewal sales opportunity, wherein the current context of the one or more data object instances is based on completed actions in the sequence of actions in each stage and sub-stage of the selected playbook;

detecting a change in the current context of one or more of the plurality of data objects; and causing, in response to the detecting of the change in the context, the graphical user interface displayed to the selected user to reflect at least one different suggested future action.

9. A computer-implemented method as in claim 8, wherein the at least one different suggested future action is defined by the playbook.

10. A computer-implemented method in claim 8, wherein the at least one different suggested future action is defined by a second playbook, and wherein the operation comprise selecting the second playbook based on the change in the current context.

11. A computer-implemented method in claim 8, wherein the data objects are part of an asset data model comprising a flexible mechanism for representing complex relationships among assets, organizations, people, and products; and wherein the data objects comprise product object instances representing products upon which recurring revenue assets are based, asset object instances representing the recurring revenue assets, opportunity object instances representing opportunities for renewal of the recurring revenue assets, and contact object instances representing contacts relating to one or more other data objects in the asset data model.

12. A computer-implemented method in claim 11, wherein the playbook comprises contextual logic that detects and understands impacts of completed actions in the renewal sales process on the current context of the one or more data object instances, and wherein the at least one different suggested future action is determined based on the contextual logic.

13. A computer-implemented method in claim 12, wherein the current context comprises a state of one or more data objects of the plurality of data objects relative to a time defined in the playbook.

14. A computer-implemented method in claim 8, wherein selecting of the playbook comprises determining that the playbook has defined characteristics matching the attributes of the data objects.

15. A system comprising:

computer hardware configured to perform operations comprising:

comparing a plurality of attributes of each of a plurality of data objects associated with a renewal sales opportunity to a plurality of defined characteristics for a playbook of a plurality of playbooks, the plurality of attributes defining a focus category for each data object, each playbook comprising a plurality of stages of a renewal sales process, one or more of the plurality of stages further comprising one or more sub-stages, each stage and sub-stage comprising a configurable sequence of actions for moving the renewal sales opportunity toward a successful closing during a target time period;

selecting the playbook from the plurality of playbooks for use with the renewal sales opportunity based on the comparing;

selecting a user of a plurality of users based on the focus category for the renewal sales opportunity and a priority assigned to the focus category;

causing a graphical user interface displayed to the selected user to indicate a sequence of one or more suggested future actions to be performed by the user in association with the renewal sales opportunity, the sequence of one or more suggested future actions being defined by the playbook based on a current context of one or more data object instances associated with the renewal sales opportunity;

detecting a change in the current context of one or more of the plurality of data objects; and causing, in response to the detecting of the change in the context, the graphical user interface displayed to the selected user to reflect at least one different suggested future action.

16. A system as in claim 15, wherein the at least one different suggested future action is defined by the playbook.

17. A system as in claim 15, wherein the at least one different suggested future action is defined by a second playbook, and wherein the operation comprise selecting the second playbook based on the change in the current context.

18. A system as in claim 15, wherein the data objects are part of an asset data model comprising a flexible mechanism for representing complex relationships among assets, organizations, people, and products; and wherein the data objects comprise product object instances representing products upon which recurring revenue assets are based, asset object instances representing the recurring revenue assets, opportunity object instances representing opportunities for renewal of the recurring revenue assets, and contact object instances representing contacts relating to one or more other data objects in the asset data model.

19. A system as in claim 18, wherein the playbook comprises contextual logic that detects and understands impacts of completed actions in the renewal sales process on the current context of the one or more data object instances, and wherein the at least one different suggested future action is determined based on the contextual logic.

20. A system as in claim 19, wherein the current context comprises a state of the one or more data objects of the plurality of data objects relative to a time defined in the playbook.

* * * * *